(12) United States Patent
Mathias et al.

(10) Patent No.: US 7,780,944 B2
(45) Date of Patent: Aug. 24, 2010

(54) MULTI-STREAM MICROCHANNEL DEVICE

(75) Inventors: James A. Mathias, Carbondale, IL (US);
G. Bradley Chadwell, Reynoldsburg, OH (US); Dongming Qiu, Bothell, WA (US); Annalee Y. Tonkovich, Dublin, OH (US); Steven T. Perry, Galloway, OH (US); Matthew B. Schmidt, Columbus, OH (US); Sean P. Fitzgerald, Columbus, OH (US); David J. Hesse, Columbus, OH (US); Thomas D. Yuschak, Lewis Center, OH (US); Bin Yang, Columbus, OH (US)

(73) Assignee: Velocys, Inc., Plain City, OH (US)

( * ) Notice: Subject to any disclaimer, the term of this patent is extended or adjusted under 35 U.S.C. 154(b) by 1166 days.

(21) Appl. No.: 11/300,914

(22) Filed: Dec. 15, 2005

(65) Prior Publication Data

US 2006/0147370 A1 Jul. 6, 2006

Related U.S. Application Data

(62) Division of application No. 10/222,604, filed on Aug. 15, 2002, now Pat. No. 7,014,835.

(51) Int. Cl.
*C01B 3/24* (2006.01)
*C01B 3/26* (2006.01)
(52) U.S. Cl. ...................... 423/650; 423/651
(58) Field of Classification Search .................. 423/652
See application file for complete search history.

(56) References Cited

U.S. PATENT DOCUMENTS 3,176,763 A    4/1965  Frohlich
(Continued)

FOREIGN PATENT DOCUMENTS

DE              693926           7/1940
(Continued)

OTHER PUBLICATIONS

Final Office Action (Jun. 24, 2005), U.S. Appl. No. 10/636,659, filed Aug. 7, 2003, a CIP of U.S. Appl. No. 10/219,990, filed Aug. 15, 2002. The parent of the '659 case (U.S. Appl. No. 10/219,990, filed Aug. 15, 2002), the parent of this '914 case (U.S. Appl. No. 10/222,604, filed Aug. 15, 2002), and a third case (U.S. Appl. No. 10/222,196, filed Aug. 15, 1002) were filed the same day, contain related subject matter, and each incorporates the contents of the others.

(Continued)

*Primary Examiner*—Melvin C Mayes
*Assistant Examiner*—Kenneth Vaden
(74) *Attorney, Agent, or Firm*—William B. Richards, Esq.; The Richards Law Firm

(57) ABSTRACT

The invention is a process and device for exchanging heat energy between three or more streams in a microchannel heat exchanger which can be integrated with a microchannel reactor to form an integrated microchannel processing unit. The invention enables the combining of a plurality of integrated microchannel devices to provide the benefits of large-scale operation. In particular, the microchannel heat exchanger of the present invention enables flexible heat transfer between multiple streams and total heat transfer rates of about 1 Watt or more per core unit volume expressed as W/cc.

19 Claims, 20 Drawing Sheets

U.S. PATENT DOCUMENTS

| | | | |
|---|---|---|---|
| 3,823,457 A | 7/1974 | Staas et al. | |
| 4,128,409 A | 12/1978 | Bennett | |
| 4,183,403 A | 1/1980 | Nicholson | |
| 4,386,505 A | 6/1983 | Little | |
| 4,392,362 A | 7/1983 | Little | |
| 4,434,845 A | 3/1984 | Steeb | |
| 4,516,632 A | 5/1985 | Swift et al. | |
| 4,690,702 A | 9/1987 | Paradowski et al. | |
| 4,752,599 A | 6/1988 | Nakamura et al. | |
| 4,761,515 A | 8/1988 | Gondouin | |
| 4,940,826 A | 7/1990 | Font Freide et al. | |
| 5,015,444 A | 5/1991 | Koga et al. | |
| 5,058,665 A | 10/1991 | Harada | |
| 5,080,875 A | 1/1992 | Bernauer | |
| 5,114,450 A | 5/1992 | Paradowski et al. | |
| 5,250,489 A | 10/1993 | Dalla Betta et al. | |
| 5,271,459 A | 12/1993 | Daschmann | |
| 5,309,637 A | 5/1994 | Moriarty | |
| 5,317,805 A | 6/1994 | Hoopman et al. | |
| 5,324,452 A | 6/1994 | Allam et al. | |
| 5,328,359 A | 7/1994 | Retallick | |
| 5,366,719 A | 11/1994 | van Wingerden et al. | |
| 5,417,938 A | 5/1995 | Shelden et al. | |
| 5,518,697 A | 5/1996 | Dalla Betta et al. | |
| 5,534,328 A | 7/1996 | Ashmead et al. | |
| 5,565,009 A | 10/1996 | Ruhl et al. | |
| 5,590,538 A | 1/1997 | Hsu et al. | |
| 5,609,834 A | 3/1997 | Hamada et al. | |
| 5,611,214 A | 3/1997 | Wegeng et al. | |
| 5,670,269 A | 9/1997 | Hamada et al. | |
| 5,674,301 A | 10/1997 | Sakai et al. | |
| 5,689,966 A | 11/1997 | Zess et al. | |
| 5,727,618 A | 3/1998 | Mundinger et al. | |
| 5,775,114 A | 7/1998 | Ji | |
| 5,791,160 A | 8/1998 | Mandler et al. | |
| 5,811,062 A | 9/1998 | Wegeng et al. | |
| 5,858,314 A | 1/1999 | Hsu et al. | |
| 5,911,273 A | 6/1999 | Brenner et al. | |
| 5,927,396 A | 7/1999 | Damsohn et al. | |
| 5,961,932 A | 10/1999 | Ghosh et al. | |
| 5,976,472 A | 11/1999 | Chatterjee et al. | |
| 6,056,932 A | 5/2000 | von Hippel et al. | |
| 6,063,342 A | 5/2000 | Kato et al. | |
| 6,105,388 A | 8/2000 | Acharya et al. | |
| 6,105,389 A | 8/2000 | Paradowski et al. | |
| 6,117,578 A | 9/2000 | Lesieur | |
| 6,126,723 A | 10/2000 | Drost et al. | |
| 6,129,973 A | 10/2000 | Martin et al. | |
| 6,143,943 A | 11/2000 | Oroskar et al. | |
| 6,159,358 A | 12/2000 | Mulvaney, III et al. | |
| 6,167,952 B1 | 1/2001 | Downing | |
| 6,190,624 B1 | 2/2001 | Romatier | |
| 6,192,596 B1 | 2/2001 | Bennett et al. | |
| 6,193,501 B1 | 2/2001 | Masel et al. | |
| 6,200,536 B1 | 3/2001 | Tonkovich et al. | |
| 6,203,587 B1 | 3/2001 | Lesieur et al. | |
| 6,216,343 B1 | 4/2001 | Leland et al. | |
| 6,217,832 B1 | 4/2001 | Betta et al. | |
| 6,220,497 B1 | 4/2001 | Benz et al. | |
| 6,228,341 B1 | 5/2001 | Hebert et al. | |
| 6,230,408 B1 | 5/2001 | Ehrfeld et al. | |
| 6,241,875 B1 | 6/2001 | Gough | |
| 6,274,101 B1 | 8/2001 | Sechrist | |
| 6,294,138 B1 | 9/2001 | von Hippel et al. | |
| 6,295,833 B1 | 10/2001 | Hoffart et al. | |
| 6,298,688 B1 | 10/2001 | Brostow et al. | |
| 6,313,393 B1 | 11/2001 | Drost | |
| 6,318,913 B2 | 11/2001 | Wakamiya et al. | |
| 6,352,577 B1 | 3/2002 | Martin et al. | |
| 6,364,007 B1 | 4/2002 | Fischer | |
| 6,381,846 B2 | 5/2002 | Insley et al. | |
| 6,389,696 B1 | 5/2002 | Heil et al. | |
| 6,412,302 B1 | 7/2002 | Foglietta | |
| 6,415,860 B1 | 7/2002 | Kelly et al. | |
| 6,427,483 B1 | 8/2002 | Rashad | |
| 6,488,838 B1 | 12/2002 | Tonkovich et al. | |
| 6,497,856 B1 | 12/2002 | Lomax, Jr. et al. | |
| 6,540,975 B2 | 4/2003 | Tonkovich et al. | |
| 6,546,998 B2 | 4/2003 | Oh et al. | |
| 6,566,573 B1 | 5/2003 | Bharadwaj | |
| 6,616,909 B1 | 9/2003 | Tonkovich et al. | |
| 6,675,875 B1 | 1/2004 | Vafai et al. | 165/80.4 |
| 6,680,044 B1 | 1/2004 | Tonkovich et al. | |
| 6,709,640 B1 | 3/2004 | Romatier et al. | |
| 6,746,819 B1 | 6/2004 | Schmitz et al. | 430/272.1 |
| 6,747,178 B1 | 6/2004 | Harston et al. | 570/175 |
| 6,749,814 B1 | 6/2004 | Bergh et al. | 422/130 |
| 6,749,817 B1 | 6/2004 | Mulvaney, III | 422/200 |
| 6,755,211 B1 | 6/2004 | O'Connor et al. | 137/554 |
| 6,769,444 B2 | 8/2004 | Guzman et al. | 137/15.01 |
| 6,770,245 B2 | 8/2004 | Akporiaye et al. | 422/82.12 |
| 6,773,684 B2 | 8/2004 | Lesieur et al. | 422/198 |
| 6,969,506 B2 * | 11/2005 | Tonkovich et al. | 423/652 |
| 2001/0018140 A1 | 8/2001 | Hermann et al. | |
| 2001/0024629 A1 | 9/2001 | Brauchle et al. | |
| 2001/0025705 A1 | 10/2001 | Nash et al. | |
| 2001/0030041 A1 | 10/2001 | Boneberg et al. | |
| 2001/0051662 A1 | 12/2001 | Arcuri et al. | |
| 2002/0029871 A1 | 3/2002 | Kern | |
| 2002/0031455 A1 | 3/2002 | Hippel et al. | |
| 2002/0036079 A1 | 3/2002 | Morel et al. | |
| 2002/0051741 A1 | 5/2002 | Abe et al. | |
| 2002/0071797 A1 | 6/2002 | Loffler et al. | |
| 2002/0081473 A1 | 6/2002 | Hanai et al. | |
| 2002/0106539 A1 | 8/2002 | Chung et al. | |
| 2002/0131907 A1 | 9/2002 | Iwasaki | |
| 2003/0007904 A1 | 1/2003 | Tonkovich et al. | |
| 2003/0105172 A1 | 6/2003 | Bowe et al. | |
| 2003/0118486 A1 | 6/2003 | Zhou et al. | |
| 2004/0104010 A1 | 6/2004 | Kenny et al. | 165/80.4 |
| 2004/0123626 A1 | 7/2004 | Caze et al. | 65/17.2 |
| 2004/0125689 A1 | 7/2004 | Ehrfeld et al. | 366/165.1 |
| 2004/0130057 A1 | 7/2004 | Mehrabi et al. | 264/171.13 |
| 2004/0131345 A1 | 7/2004 | Kylberg et al. | 392/465 |
| 2004/0131507 A1 | 7/2004 | Saitmacher et al. | 422/111 |
| 2004/0131829 A1 | 7/2004 | Joseph et al. | 428/166 |
| 2004/0136902 A1 | 7/2004 | Plath et al. | 423/651 |
| 2004/0141893 A1 | 7/2004 | Martin | 422/198 |
| 2004/0143059 A1 | 7/2004 | Cabrera | 524/800 |
| 2004/0144421 A1 | 7/2004 | Parce et al. | 137/14 |
| 2004/0156762 A1 | 8/2004 | Schuppich et al. | 422/191 |
| 2005/0138864 A1 | 6/2005 | Johnston et al. | |
| 2006/0014894 A1 | 1/2006 | Torii et al. | |

FOREIGN PATENT DOCUMENTS

| | | |
|---|---|---|
| DE | 19648902 A1 | 6/1998 |
| EP | 1 311 341 B1 | 8/2001 |
| FR | 2184536 | 12/1973 |
| WO | 9739490 A3 | 10/1997 |
| WO | 97/32687 | 12/1997 |
| WO | 98/55812 | 12/1998 |
| WO | 99/53561 A1 | 1/1999 |
| WO | WO9900186 | 1/1999 |
| WO | WO9953561 | 10/1999 |
| WO | 00/06295 | 2/2000 |
| WO | 00/76651 A1 | 12/2000 |
| WO | 01/10773 A1 | 2/2001 |
| WO | 01/12312 A2 | 2/2001 |
| WO | 01/12753 A1 | 2/2001 |
| WO | WO0112312 | 2/2001 |
| WO | 01/54807 A1 | 8/2001 |
| WO | WO0154807 | 8/2001 |
| WO | 01/69154 A1 | 9/2001 |

| | | |
|---|---|---|
| WO | 01/95237 A2 | 12/2001 |
| WO | 02/00547 A1 | 1/2002 |
| WO | 02/02220 A1 | 1/2002 |
| WO | 02/28769 A2 | 4/2002 |
| WO | WO0228769 | 4/2002 |
| WO | 02/061354 A1 | 8/2002 |
| WO | 02/064248 A2 | 8/2002 |
| WO | 03/026788 | 4/2003 |
| WO | WO03035546 | 5/2003 |
| WO | 03/078052 A1 | 9/2003 |
| WO | 03/106386 A2 | 12/2003 |
| WO | 2004/017008 A1 | 2/2004 |
| WO | 2004/045760 | 6/2004 |
| WO | 2004/050799 | 6/2004 |
| WO | 2004/052518 | 6/2004 |
| WO | 2004/052530 | 6/2004 |
| WO | 2004/052941 | 6/2004 |
| WO | 2004/054013 | 6/2004 |
| WO | 2004/054696 | 7/2004 |
| WO | 2004/062790 | 7/2004 |
| WO | 2004/062791 | 7/2004 |
| WO | 2004/062792 | 7/2004 |
| WO | 2004/067160 | 8/2004 |
| WO | 2004/067444 | 8/2004 |
| WO | 2004/067708 | 8/2004 |

OTHER PUBLICATIONS

Non-Final Office Action (Mar. 3, 2005), U.S. Appl. No. 10/636,659, filed Aug. 7, 2003, a CIP of U.S. Appl. No. 10/219,990, filed Aug. 15, 2002. The parent of the '659 case (U.S. Appl. No. 10/219,990, filed Aug. 15, 2002), the parent of this '914 case (U.S. Appl. No. 10/222,604, filed Aug. 15, 2002), and a third case (U.S. Appl. No. 10/222,196, filed Aug. 15, 2002) were filed the same day, contain related subject matter, and each incorporates the contents of the others.

Non-Final Office Action (Oct. 13, 2004), U.S. Appl. No. 10/636,659, filed Aug. 7, 2003, a CIP of U.S. Appl. No. 10/219,990, filed Aug. 15, 2002. The parent of the '659 case (U.S. Appl. No. 10/218,990, filed Aug. 15, 2002), the parent of this '914 case (U.S. Appl. No. 10/222,604, filed Aug. 15, 2002), and a third case (U.S. Appl. No. 10/222,196, filed Aug. 15, 2002) were filed the same day, contain related subject matter, and each incorporates the contents of the others.

Final Office Action (Dec. 26, 2008), U.S. Appl. No. 11/232,485, filed Sep. 21, 2005.

Non-Final Office Action (Jun. 3, 2009), U.S. Appl. No. 11/232,485, filed Sep. 21, 2005.

Finn et al., "Design, Equipment Changes Make Possible High C3 Recovery", Oil & Gas Journal, Jan. 3, 200, pp. 37-44. Note: From related case U.S. Appl. No. 10/219,990.

Finn et al., "Developments in Natural Gas Liquefaction", Hydrocarbon Processing, Apr. 1999, pp. 47-59. Note: From related case U.S. Appl. No. 10/219,990.

Hydrocarbon Processing, May 2002, "LNG-Pro", p. 83. Note: From related case U.S. Appl. No. 10/219,990.

Hydrocarbon Processing, May 2002, "NGL Recovery", p. 83. Note: From related case U.S. Appl. No. 10/219,990.

Hydrocarbon Processing, May 2002, "LNG End Flash (Maxi LNG Production)", p. 82. Note: From related case U.S. Appl. No. 10/121,9,990.

Hydrocarbon Processing, May 2002, "LNG Plants", p. 82. Note: From related case U.S. Appl. No. 10/219,990.

Hydrocarbon Processing, May 2002, "Cryomax DCP (Dual-Column Propane Recovery)", p. 81. Note: From related case U.S. Appl. No. 10/219,990.

Hydrocarbon Processing, May 2002, "Liquefin", p. 81. Note: From related case U.S. Appl. No. 10/219,990.

Hydrocarbon Processing, May 2002, "Prico (LNG)", p. 87. Note: From related case U.S. Appl. No. 10/219,990.

Hydrocarbon Processing, May 2002, "Separex Membrane Systems", p. 87. Note: From related case U.S. Appl. No. 10/219,990.

Tegrotenhuis et al., "Optimizing Microchannel Reactors by Trading-Off Equilibrium and Reaction Kinetics Through Temperature Management", International Conference on Microreaction Technology, Mar. 10-14, 2002. Note: From related case U.S. Appl. No. 10/219,990.

Srinivasan et al., "Micromachined Reactors for Catalytic Partial Oxidation Reactions", AIChE Journal, Nov. 1997, vol. 43, No. 11. Note: From related case U.S. Appl. No. 10/1219,990.

Smith, Eric M., "Thermal Design of Heat Exchangers. A Numerical Approach", 1997, Wiley, New York. Note: From related case U.S. Appl. No. 10/219,990.

Matlosz, M. et al., "Microreaction Technology", Proceeding of the Fifth International Conference on Microreaction Technology, Oct. 2001, Springer-Verlag. Note: From related case U.S. Appl. No. 10/219,990.

Notice of Allowance (Apr. 22, 2003), U.S. Appl. No. 10,219.990, filed Aug. 15, 2002.

Pettersen et al., "Development of Compact Heat Exchangers for CO2 Air Conditioning Systems", vol. 21, No. 3, pp. 180-193, 1998, Great Britain. Note: From related case U.S. Appl. No. 10/219,990.

Wadekar, V. V., Compact Heat Exchangers: A ChE's Guide to CHEs, American Institute of Chemical Engineers, Dec. 2000, pp. 39-40, United States. Note: From related case U.S. Appl. No. 10/219,990.

Rostami, A. A. et al., "Flow and Heat Transfer for Gas Flowing in Microchannels: A Review", Heat and Mass Transfer 38, 2002, pp. 359-363, Springer-Veriag. Note: From related case U.S. Appl. No. 10/219,990.

Wegeng, R. S. et al., "Compact Fuel Processors for Fuel Cell Powered Automobiles Based on Microchannel Technology", Fuel Cells Bulletin No. 28, pp. 8-13. Note: From related case U.S. Appl. No. 10/219,990.

Kays, W. M., "Compact Heat Exchangers", Third Ed., 1984, Reprint Ed. with corrections, 1998, Kreiger Publishing Co., Malabar, FL. Note: From related case U.S. Appl. No. 10/219,990.

Brouwers, "Heat Transfer, Condensation and Fog Formation in Crossflow Plastic Heat Exchangers", Int. J. Heat Mass Transfer, vol. 39, No. 2, pp. 391-405, 1996. Note: From related case U.S. Appl. No. 10/219,990.

Haack et al., "Novel Lightweight Metal Foam Heat Exchangers", Provair Fuel Cell Technology, Inc. and University of Cambridge. Note: From related case U.S. Appl. No. 10/219,990, 2001.

Fischer, "A New Process to Reduce LNG Cost", Prepared for presentation at AIChE Spring National Meeting, Mar. 10-14, 2002. Note: From related case U.S. Appl. No. 10/219,990.

Quadir et al., "Analysis of Microchannel Heat Exchangers Using FEM", International Journal of Numerical Methods for Heat & Fluid Flow, vol. 11, No. 1, 2002, pp. 59-75. Note: From related case U.S. Appl. No. 10/219,990.

Genssle et al., "Analysis of the Process Characteristics of an Absorption Heat Transformer with Compact Heat Exchangers in the Mixture TFE-E181", Int. J. Therm. Sci. (2000) 39, 30-38. Note: From related case U.S. Appl. No. 10/219,990.

Nasrifar et al., "A Saturated Liquid Equation in Conjunction with the Predictive-Soave-Redlich-Kwong Equation of State for Pure Refrigerants and LNG Multicomponent Systems", Fluid Phase Equilibria 153 (1998) 231-242. Note: From related case U.S. Appl. No. 10/219,990.

Van Reisen et al., "The Placement of Two-Stream and Multi-Stream Heat Exchangers in an Existing Network Through Pat Analysis", Computers Chem. Engng., vol. 19, Suppl., pp. S143-S148, 1995. Note: From related case U.S. Appl. No. 10/219,990.

Mollenkopf et al., "Multistream Heat Exchangers—Types, Capabilities and Limits of Design", Heat and Mass Transfer in Refrigeration and Cryogenics, Hemisphere/Springer-Verlag, pp.537-546. Note: From related case U.S. Appl. No. 10/219,990.

Haseler, "Performance Calculation Methods for Multi-Stream Plate-Fin Heat Exchangers", In: "Heat Exchangers: Theory and Practice", Hemisphere/McGraw Hill, pp. 495-505 (1983). Note: From related case U.S. Appl. No. 10/219,990.

Jiang et al., "Forced Convection Boiling in a Microchannel Heat Sink", Journal of Microelectromechanical Systems, vol. 10, No. 1, Mar. 2001. Note: From related case U.S. Appl. No. 10/219,990.

Kandlikar et al., "High-Speed Photographic Observation of Flow Boiling of Water in Parallel Mini-Channels", Proceedings of ASME NHTC'01 35th International Heat Transfer Conference, 2001, pp. 1-10. Note: From related case U.S. Appl. No. 10/219,990.

1997 ASHRAE Fundamentals Handbook, pp. 1.4-1.14. Note: From related case U.S. Appl. No. 10/219,990.

Kelly et al., "Industrial Applications for LIGA-Fabricated Micro Heat Exchangers", MEMS Components and Applications for Industry, Automobiles, Aerospace and Communications, Proceeding of SPIE, vol. 4559 (2001), pp. 73-84. Note: From related case U.S. Appl. No. 10/219,990.

Mezzo Systems, Inc., "Innovative Technologies for Mass Production of Microstructures", Date 2001.

Haynes et al., "High-Effectiveness Micro-Exchanger Performance", 2002 Heatric (a division of Meggitt (UK Ltd.), Prepared for presentation at the AIChE 2002 Spring National Meeting, Mar. 10-14, 2002. Note: From related case U.S. Appl. No. 10/219,990.

Patel et al., "Design, Construction and Performance of Plastic Heat Exchangers for Sub-Kelvin Use". Cryogenics 40 (2000) 91-98. Note: From related case U.S. Appl. No. 10/219,990.

El-Dessouky et al., "Plastic/Compact Heat Exchangers for Single-Effect Desalination Systems", Desalination 122 (1999) 271-289. Note: From related case U.S. Appl. No. 10/219,990.

Munkejord et al., "Micro Technology in Heat Pumping Systems", International Journal of Refrigeration 25 (2002) 471-478. Note: From related case U.S. Appl. No. 10/219,990.

Non-Final Office Action (Nov. 29, 2005), U.S. Appl. No. 10/222,196, filed Aug. 15, 2002. The '196 case, case U.S. Appl. No. 10/219,990, filed Aug. 15, 2002), and the parent of this '914 case (U.S. Appl. No. 10/222,604, filed Aug. 15, 2002) were filed the same day, contained related subject matter, and each incorporates the contents of the others.

Non-Final Office Action (May 23, 2006), U.S. Appl. No. 10/222,196, filed Aug. 15, 2002. The '196 case, case U.S. Appl. No. 10/219,990, filed Aug. 15, 2002), and the parent of this '914 case (U.S. Appl. No. 10/222,604, filed Aug. 15, 2002) were filed the same day, contained related subject matter, and each incorporates the contents of the others.

Final Office Action (Nov. 8, 2006), U.S. Appl. No. 10/222,196, filed Aug. 15, 2002. The '196 case, case U.S. Appl. No. 10/219,990, filed Aug. 15, 2002), and the parent of this '914 case (U.S. Appl. No. 10/222,604, filed Aug. 15, 2002) were filed the same day, contained related subject matter, and each incorporates the contents of the others.

Notice of Allowability (Mar. 22, 2007), U.S. Appl. No. 10/222,196, filed Aug. 15, 2002. The '196 case, case U.S. Appl. No. 10/219,990, filed Aug. 15, 2002), and the parent of this '914 case (U.S. Appl. No. 10/222,604, filed Aug. 15, 2002) were filed the same day, contained related subject matter, and each incorporates the contents of the others.

Non-Final Office Action (Feb. 27, 2009), U.S. Appl. NO. 11/825,286, filed Jul. 3, 2007, a DIV of U.S. Appl. No. 10/222,196, filed Aug. 15, 2002. The '196 case, the parent of this '914 case (U.S. Appl. NO. 10/222,604, filed Aug. 15, 2002), and a third case (U.S. Appl. No. 10/219,990, filed Aug. 15, 2002) were filed the same day, contained related subject matter, and each incorporates the contents of the others.

PCT Preliminary Examination Report, PCT/US03/22490, mailed Aug. 30, 2004.

Luyben et al., "An Industrial Design/Control Study for the Vinyl Acetate Monomer Process", Computers in Chem. Engng., v.22, n. 7-8, pp. 867-877 (1998).

Non-Final Office Action (Mar. 4, 2003), U.S. Appl. No. 10/219,990, filed Aug. 15, 2002.

Besser, Ronald S. "New Directions in Reactor Design Through Miniaturization". Sep. 13, 2002, Tulane Engineering Forum.

Ouyang et al. "Flexible Microreactor System for Chemical Research at Moderate and High Temperatures". Stevens Institute of Technology, Date 2000.

Venkatarathnam et al.; "Performance of a counter flow heat exchanger with longitudinal heat conduction through the wall separating the fluid streams from the environment"; Cryogenics 39 (1999) 811-819.

Boman et al.; "Design and Manufacture of ultra-low mass, cryogenic heat exchangers"; Cryogenics 41 (2002) 797-803.

Aganda et al.; "Airflow maldistribution and the performance of a packaged air conditioning unit evaporator"; Applied Thermal Engineering 20 (2000) 515-528.

Kim et al.; "Development of a microchannel evaporator model for a CO2 air-conditioning system"; Energy 26 (2001) 931-948.

Murray et al.; "Overview of the Development of Heat Exchangers for Use in Air-Breathing Propulsion Pre-Coolers"; Acta Astronautica, vol. 41, No. 11, pp. 723-729; 1997.

Bier et al.; "Gas to gas heat transfer in micro heat exchangers"; Chemical Engineering and Processing, 32 (1993) 33-43.

Stief et al.; "Numerical Investigations and Optimal Heat Conductivity in Micro Heat Exchangers"; DECHEMA Society for Chemical Engineering and Biotechnology; Prepared for presentation at AIChE 2000 Spring National meeting (Mar. 5-9, 2000).

Chong et al.; "Optimisation of single and double layer counter flow microchannel het sinks"; Applied Thermal Engineering 22 (2002)1569-1585.

Aganda et al.; "A comparison of the predicted and experimental heat transfer performance of a finned tube evaporator"; Applied Thermal Engineering 20 (2000) 499-513.

Lin et al.; "Prospects of confined flow boiling in thermal management of microsystems"; Applied Thermal Engineering 22 (2002) 825-837.

Prasad et al.; "Differential method for sizing multistream plate fin heat exchangers"; Cryogenics 1987, vol. 27, May, pp. 257-262.

Prasad; "The Performance Prediction of Multistream Plate-Fin Heat Exchangers Based on Stacking Pattern"; Heat Transfer Engineering, vol. 12, No. 4,1991, pp. 58-70.

V.V. Wadekar; "Compact heat exchangers (CHEs) offer high heat-transfer coefficients and large surface areas with a small footprint, making them a cost-effective alternative to shell-and-tube exchangers in many applications"; American Institute of Chemical Engineers; 2000; pp. 39-49, www.aiche.org/cep/december2000.

Landrarn et al.; "Microchannel Flow Boiling Mechanisms Leading to Burnout"; Heat Transfer in Electronic Systems; HTD-vol. 292, pp. 129-136, ASME 1994.

Prasad; "Fin efficiency and mechanisms of heat exchange through fins in multi-stream plate-fin heat exchangers: development and application of a rating algorithm"; Int. J. Heat Mass Transfer; vol. 40, No. 18, pp. 4279-4288, 1997.

Miller et al.; "Experimental Molar Volumes for Some LNG-Related Saturated Liquid Mixtures"; Fluid Phase Equilibria, 2 (1978) 49-57.

Rachkovskij et al.; "Heat exchange in short microtubes and micro heat exchangers with low hydraulic losses"; Microsystem Technologies 4 (1998) 151-158.

Jiang et al.; "Thermal-hydraulic performance of small scale microchannel and porous-media heat-exchangers"; International Journal of Heat and Mass Transfer 44 (2001) 1039-1051.

Ehlers et al.; "Mixing in the offstream of a microchannel system"; Chemical Engineering and Processing 39 (2000) 291-298.

Bach et al.; "Spiral Wound Heat Exchangers for LNG Baseload Plants"; Linde AG, Process and Engineering and Contracting Division (Linde); PS5-1.1-PS5 1.13, Date 1985.

Zhao et al.; "Microchannel Heat Exchangers with Carbon Dioxide"; Center for Environmental Energy Engineering, Department of Mechanical Engineering, University of Maryland; Prepared for the Air-Conditioning and Refrigeration Technology Institute; Sep. 2001.

Sekulic et al.; "Thermal Design Theory of Three-Fluid Heat Exchangers"; Advances in Heat Transfer, vol. 26; pp. 219-328; 1995.

Suessman et al.; "Passage Arrangements in Plate-Fin Exchangers"; Proceedings of XV International Congress of Refrigeration; vol. 1, pp. 421-429 (1979).

Paffenbarger; "General Computer Analysis of Multistream, Plate-Fin Heat Exchangers"; Compact Heat Exchangers—A Festschrift for A. L. London, Hemisphere, pp. 727-746 (1990).

Schack et al.; "Industrial Heat Transfer"; Heat Exchangers Without Storage (Recuperators); John Wiley & Sons, Inc., New York, 1933; pp. 208-237.

Prasad; "Fin efficiency and mechanisms of heat exchange through fins in multi-stream plate-fin heat exchangers: formulation"; Int. J. Heat Mass Transfer; vol. 39, No. 2, pp. 419-428; 1996.

Prasad et al.; "Differential Methods for the Performance Prediction of Multistream Plate-Fin Heat Exchangers"; Journal of Heat Transfer; Feb. 1992, vol. 114, pp. 41-49.

Jiao et al.; "Experimental investigation of header configuration on flow maldistribution in plate-fin heat exchanger"; Applied Thermal Engineering 23 (2003) 1235-1246.

Ranganayakulu et al.; "The effects of inlet fluid flow nonuniformity on thermal performance and pressure drops in crossflow plate-fin compact heat exchangers"; Int. J. Heat Mass Transfer, vol. 40, No. 1, pp. 27-38; 1997.

Ranganayakulu et al.; "The combined effects of wall longitudinal heat conduction, inlet fluid flow nonuniformity and temperature nonuniformity in compact tube-fin heat exchangers; a finite element method"; International Journal of Heat and Mass Transfer 42 (1999) 263-273.

Office Action in corresponding Japanese Patent Application No. 2004-539806, mailed Sep. 24, 2008. English translation.

Office Action in corresponding Chinese Patent Application No. 03823737.7, mailed May 22, 2009. English translation.

Office Action in corresponding European Patent Application No. 03789688.3, mailed Jan. 13, 2009.

PCT Written Opinion, PCT/US03/22490, mailed Jul. 9, 2004.

PCT Invitation to Pay Additional Fees with Intl Search Report, PCT/US03/22490, mailed Apr. 16, 2004.

Notification of Decision of Rejection, The State Intellectual Property Office of the People's Republic of China, Dated: Sep. 25, 2009; Received: Dec. 2, 2009; Application No. 0381878.X; Multi-stream Microchannel Device; National stage entry from PCT application of the parent of the instant application.

* cited by examiner

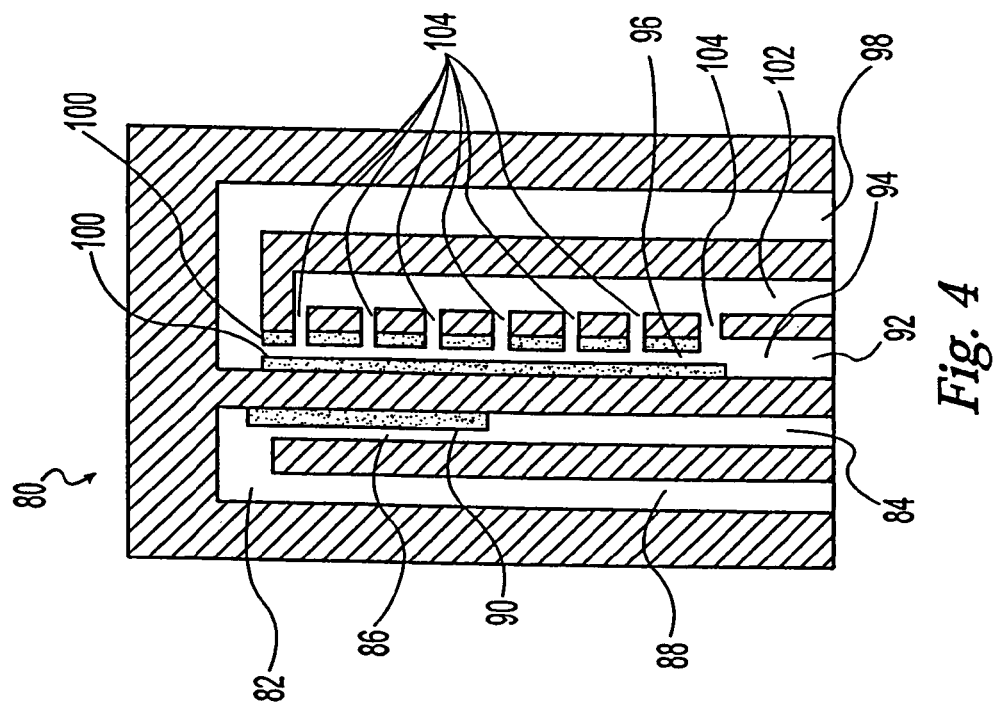
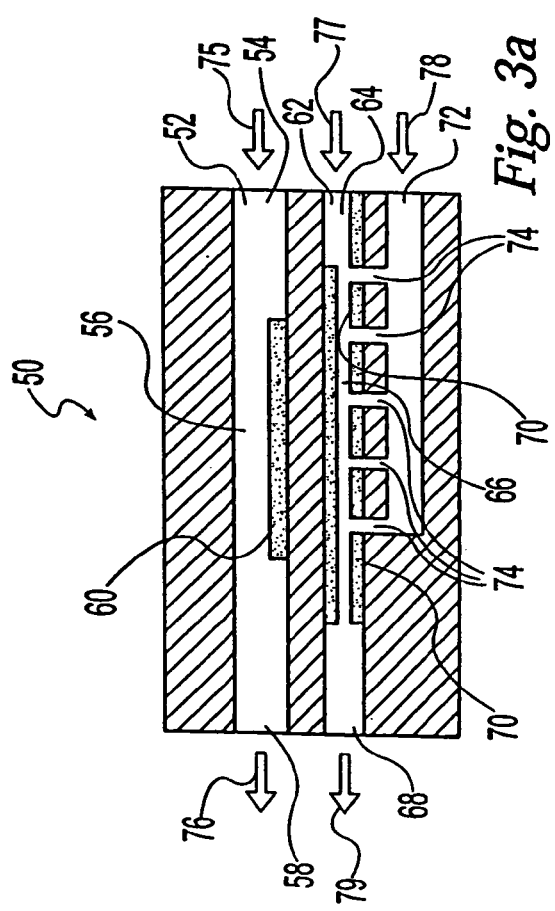
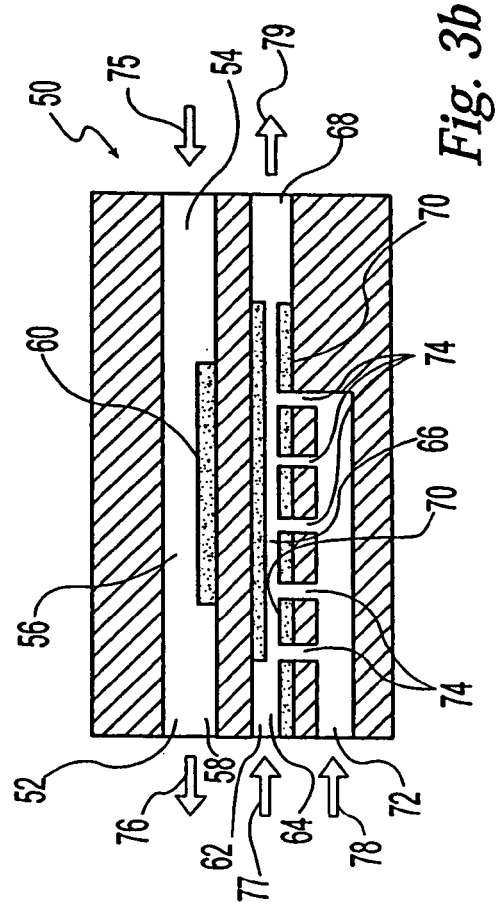

NOTE: ALL DIMENSIONS IN INCHES. UNIT LENGTH IS 10 INCHES.

| Volumetric Flowrate | | | | | | | |
|---|---|---|---|---|---|---|---|
| Experimental Run No. | Stream A | Stream B | Stream C1 | Stream C2 | Stream D1 | Stream D2 | Stream E |
| | SLPM | SLPM | SLPM | SLPM | SLPM | SLPM | SLPM |
| 1 | 13.76 | 7.38 | 4.66 | 3.11 | 3.80 | 3.80 | 2.41 |
| 2 | 13.76 | 7.38 | 4.66 | 3.11 | 3.80 | 3.80 | 2.41 |
| 3 | 9.17 | 4.92 | 3.11 | 2.07 | 2.53 | 2.53 | 1.61 |
| 4 | 6.88 | 3.69 | 2.33 | 1.55 | 1.90 | 1.90 | 1.21 |
| 5 | 5.50 | 2.95 | 1.87 | 1.24 | 1.52 | 1.52 | 0.96 |
| 6 | 4.59 | 2.46 | 1.55 | 1.04 | 1.27 | 1.27 | 0.80 |

| Outlet Pressure | | | | | | | |
|---|---|---|---|---|---|---|---|
| Experimental Run No. | Stream A | Stream B | Stream C1 | Stream C2 | Stream D1 | Stream D2 | Stream E |
| | psia | psia | psia | psia | psia | psia | psia |
| 1 | 70 | 70 | 14.7 | 14.7 | 14.7 | 14.7 | 14.7 |
| 2 | 161 | 169 | 14.7 | 14.7 | 14.7 | 14.7 | 14.7 |
| 3 | 161 | 169 | 14.7 | 14.7 | 14.7 | 14.7 | 14.7 |
| 4 | 161 | 169 | 14.7 | 14.7 | 14.7 | 14.7 | 14.7 |
| 5 | 161 | 169 | 14.7 | 14.7 | 14.7 | 14.7 | 14.7 |
| 6 | 161 | 169 | 14.7 | 14.7 | 14.7 | 14.7 | 14.7 |

| Fluid Composition | | | | | |
|---|---|---|---|---|---|
| Fluid | A | B | C | D | E |
| Composition Mole % | | | | | |
| Hydrogen | 0.68 | | | | 1.00 |
| Nitrogen | 0.20 | | 1.00 | 1.00 | |
| Water | 0.12 | 0.50 | | | |
| Methane | | 0.50 | | | |

| Residence times (all in ms) | | | | | | | |
|---|---|---|---|---|---|---|---|
| Experimental Run No. | Stream A | Stream B | Stream C1 | Stream C2 | Stream D1 | Stream D2 | Stream E |
| 1 | 4.30 | 8.96 | 3.74 | 4.01 | 3.80 | 3.73 | 11.03 |
| 2 | 9.89 | 21.64 | 3.74 | 4.01 | 3.80 | 3.73 | 11.03 |
| 3 | 14.84 | 32.45 | 5.61 | 6.03 | 5.71 | 5.61 | 16.51 |
| 4 | 19.78 | 43.27 | 7.48 | 8.05 | 7.60 | 7.47 | 21.97 |
| 5 | 24.74 | 54.13 | 9.33 | 10.06 | 9.50 | 9.33 | 27.69 |
| 6 | 29.65 | 64.91 | 11.25 | 11.99 | 11.37 | 11.17 | 33.22 |

*Fig. 12*

| Inlet Temperature deg. C | Test | Experimental Run No. | | | | | |
|---|---|---|---|---|---|---|---|
| | | #1 | #2 | #3 | #4 | #5 | #6 |
| Stream E | Test X | 149.7 | 157.8 | 148.7 | 141.2 | 151.1 | 165.3 |
| | Test Y | | 152.2 | 143.8 | 131.9 | 129.8 | 134.1 |
| | Test Z | | 114.9 | 114.8 | 113.7 | 119.1 | 121.2 |
| Stream C1 | Test X | 852.3 | 855.9 | 858.6 | 859.2 | 852.7 | 854.8 |
| | Test Y | | 848.8 | 857.4 | 851.6 | 850.5 | 853.1 |
| | Test Z | | 852.1 | 854.6 | 852.5 | 851.1 | 849.6 |
| Stream C2 | Test X | 850.7 | 852.9 | 852.3 | 858.7 | 851.2 | 852.4 |
| | Test Y | | 851.9 | 856.1 | 850.5 | 850.6 | 854.7 |
| | Test Z | | 850.2 | 848.8 | 847.6 | 846.9 | 846.5 |
| Stream D2 | Test X | 83.6 | 87.5 | 89.9 | 86.3 | 98.2 | 111.1 |
| | Test Y | | 82.3 | 83.3 | 82.3 | 85.2 | 90.7 |
| | Test Z | | 44.5 | 43.4 | 43.8 | 46.3 | 47.4 |
| Stream D1 | Test X | 43.6 | 45.2 | 49.8 | 51.0 | 64.7 | 75.1 |
| | Test Y | | 43.2 | 45.1 | 46.3 | 52.6 | 58.7 |
| | Test Z | | 36.1 | 35.0 | 35.8 | 38.3 | 39.1 |
| Stream B | Test X | 228.6 | 241.0 | 230.3 | 212.3 | 230.2 | 239.1 |
| | Test Y | | 180.4 | 172.2 | 162.3 | 164.0 | 172.8 |
| | Test Z | | 185.9 | 178.7 | 173.5 | 180.5 | 181.2 |
| Stream A | Test X | 852.2 | 857.8 | 849.3 | 859.5 | 849.3 | 846.8 |
| | Test Y | | 855.0 | 853.5 | 848.1 | 846.9 | 851.0 |
| | Test Z | | 852.9 | 854.3 | 854.6 | 854.1 | 850.3 |

*Fig. 13*

| Outlet Temperature | | | | | | | |
|---|---|---|---|---|---|---|---|
| Outlet Temperature deg. C | Test | Experimental Run No. | | | | | |
| | | # 1 | # 2 | # 3 | # 4 | # 5 | # 6 |
| Stream E | Test X | 774.0 | 778.5 | 789.7 | 806.0 | 804.1 | 809.1 |
| | Test Y | | 785.1 | 803 | 803.3 | 806.8 | 813.7 |
| | Test Z | | 794.3 | 811.0 | 816.2 | 818.7 | 819.1 |
| Stream C1 | Test X | 282.1 | 288.6 | 237.0 | 208.7 | 192.3 | 205.4 |
| | Test Y | | 288.6 | 236.1 | 199.3 | 179.3 | 173.4 |
| | Test Z | | 155.5 | 137.8 | 126.7 | 126.2 | 124.0 |
| Stream C2 | Test X | 169.7 | 177.8 | 158.7 | 142.2 | 148.0 | 160.0 |
| | Test Y | | 172.1 | 150.9 | 133.8 | 128.0 | 130.0 |
| | Test Z | | 166.2 | 145.6 | 133.0 | 131.7 | 128.8 |
| Stream D2 | Test X | 747.0 | 750.6 | 773.0 | 795.2 | 796.9 | 804.2 |
| | Test Y | | 760.2 | 787.7 | 793.1 | 799.8 | 808.8 |
| | Test Z | | 768.6 | 788.2 | 794.1 | 797.0 | 797.8 |
| Stream D1 | Test X | 762.8 | 766.6 | 779.6 | 797.0 | 797.2 | 804.0 |
| | Test Y | | 774.7 | 793.7 | 795.4 | 800.8 | 808.9 |
| | Test Z | | 782.0 | 798.1 | 802.2 | 804.5 | 805.0 |
| Stream B | Test X | 695.4 | 699.0 | 728.1 | 759.1 | 765.0 | 776.0 |
| | Test Y | | 710.5 | 745.0 | 758.2 | 766.1 | 776.5 |
| | Test Z | | 723.3 | 755.2 | 769.9 | 780.2 | 786.3 |
| Stream A | Test X | 245.0 | 252.3 | 220.6 | 208.9 | 209.2 | 218.0 |
| | Test Y | | 251.0 | 219.3 | 193.0 | 178.4 | 178.7 |
| | Test Z | | 248.6 | 214.3 | 194.0 | 186.0 | 177.2 |
| Energy Balance (%) | Test X | | 83.8 | 81.7 | 78.4 | 79.3 | 78.4 |
| | Test Y | | 80.0 | 76.0 | 76.0 | 83.7 | 82.9 |
| | Test Z | | 76.8 | 75.3 | 75.2 | 74.7 | 81.5 |

*Fig. 14*

| Pressure Drop |||||||
|---|---|---|---|---|---|---|
| Experimental Run No. | Test | Stream C2 (psi) | Stream D1 (psi) | Stream C1 (psi) | Stream B (psi) | Stream A (psi) |
| 2 | A | 2.3 | | 2.3 | | |
| | B | 2.3 | 7.1 | 3.1 | 1.7 | 3.6 |
| | C | 2.5 | 7.5 | 3.3 | 1.6 | 3.6 |
| 3 | A | 1.5 | 5.1 | 2.1 | | |
| | B | 1.5 | 4.6 | 2.1 | 1.0 | 2.0 |
| | C | 1.6 | 5.0 | 2.3 | 1.1 | 2.2 |
| 4 | A | 1.1 | 4.5 | 1.5 | | |
| | B | 1.0 | 3.3 | 1.5 | 0.9 | 1.3 |
| | C | 1.2 | 3.7 | 1.8 | 0.7 | 1.5 |
| 5 | A | 0.7 | 3.5 | 1.2 | | |
| | B | 0.8 | 2.6 | 1.2 | 0.6 | 0.9 |
| | C | 0.9 | 2.9 | 1.4 | 0.4 | 1.1 |
| 6 | A | 0.7 | | 1.1 | | |
| | B | 0.7 | 2.1 | 1.0 | 0.5 | 0.8 |
| | C | 0.8 | 2.4 | 1.2 | 0.2 | 0.9 |

*Fig. 15*

| Streams | C1 | D1 | A | B | E | C2 | D2 |
|---|---|---|---|---|---|---|---|
| Actual $T_{hot}$ deg. C | 856 | 770 | 858 | 741 | 800 | 853 | 762 |
| Calc $T_{hot}$ | 856 | 751 | 858 | 700 | 779 | 853 | 767 |
| Actual $T_{cold}$ | 328 | 88 | 266 | 242 | 158 | 250 | 45 |
| Calc $T_{cold}$ | 289 | 88 | 253 | 242 | 158 | 178 | 45 |

*Fig. 16*

Air at 400 deg. C and Re < 2000

MULTI-STREAM MICROCHANNEL DEVICE

CROSS-REFERENCE TO RELATED APPLICATIONS

This application is a Divisional of, and claims priority to, U.S. application Ser. No. 10/222,604, filed Aug. 15, 2002, entitled "Multi-Stream Microchannel Device", now U.S. Pat. No. 7,014,835, which is related to the following commonly-assigned applications filed concurrently therewith on Aug. 15, 2002: "Integrated Combustion Reactors and Methods of Conducting Simultaneous Endothermic and Exothermic Reactions", U.S. Pat. No. 7,250,151, and "Process for Cooling a Product in a Heat Exchanger Employing Microchannels for the Flow of Refrigerant and Product", U.S. Pat. No. 6,622,519, which applications are incorporated herein by reference.

FIELD OF THE INVENTION

This invention relates to microchannel devices and processes for multi-stream heat exchange and particularly to multi-stream heat exchange in combination with chemical reaction and more particularly to multi-stream heat exchange in combination with endothermic chemical reactions such as reforming and more particularly to endothermic reactions coupled with exothermic reactions such as combustion.

BACKGROUND OF THE INVENTION

Heat exchangers are critical components in virtually all unit operations involving fluid (gas or liquid) streams. They become even more critical when it is desired to add heat or thermal energy or take away heat or thermal energy from a chemical reaction. For example, endothermic reactions often require, or benefit from, the addition of heat energy. Exothermic reactions, on the other hand, often require, or benefit from, the removal of heat energy. Owing to the economic importance of many such chemical reactions, there is a continual quest for improved performance, both in terms of conversion of reactants to products and in terms of selectivity to desired products relative to undesired products.

MicroChannel Technology (MCT) has been demonstrated to provide many such benefits and recent years have seen a significant increase in the application of MCT to many unit operations. See, e.g., A. A. Rostami et al., *Flow and Heat Transfer for Gas Flowing In Microchannels: A Review*, 38 Heat and Mass Transfer 359-67 (2002) (applications in medicine biotechnology, avionics, consumer electronics, telecommunications, metrology, and many others) and R. S. Wegeng et al., *Compact Fuel Processors for Fuel Cell Powered Automobiles Based on Microchannel Technology*, Fuel Cells Bulletin No. 28 (2002) (compact hydrogen generators for fuel cells). MCT utilizes microchannel devices for carrying out processes that had previously been constrained to far larger equipment; often three to 1,000 times as large for comparable total throughput. MCT devices, which contain features of at least one internal dimension of width or height of less than about 2 mm and preferably less than about 1 mm, have the potential to change unit operations in ways analogous to the changes that miniaturization has brought to computing technology. MCT can be used to advantage in small-scale operations, such as in vehicles or personal (portable) devices. Importantly, too, MCT systems that can be economically mass-produced and connected together to accomplish large-scale operations are very desirable.

More particularly, heat exchangers have become smaller and smaller with more heat energy transferred per unit volume due to the additional area of smaller channels in heat exchangers. Earlier technology includes so-called compact heat exchangers. See, e.g., V. V. Wadekar, a *ChE's Guide to CHEs*, Chemical Engineering Progress, December 2000, 30-49. Compact heat exchangers provide heat energy transfer rate densities, or heat energy transfer rate per unit volume (thermal power density) (where the volume is the total core volume as defined herein below), only up to about 0.4 W/cc for gas-phase exchangers. MCT heat exchangers, by comparison, provide heat energy transfer rate densities (thermal power density) of about 1 W/cc to 40 W/cc. Compact heat exchangers also have low interstream planar heat transfer percents, typically less than 10 percent. MCT heat exchangers, by comparison, have much higher interstream planar heat transfer percents, typically greater than 10 percent, preferably greater than 20 percent, more preferably greater than 40 percent, and even more preferably greater than 50 percent. In addition, MCT heat exchangers can rely on smaller average approach temperatures when producing the higher thermal power densities.

The above disadvantages of compact heat exchangers can be overcome by the use of MCT heat exchangers. There are problems, however, even with existing MCT heat exchangers. For example, MCT heat exchangers have not been designed which can process more than two separate streams in a single integral device. Processing three or more streams in a heat exchanger can, for example, enable unequal heat gain and loss between the three or more streams. Thus, when it is desirable to transfer heat energy between three or more streams, a compact heat exchanger must be employed or multiple two-stream MCT heat exchangers must be employed. Even multiple two-stream MCT heat exchangers, however, allow significantly more heat transfer to the ambient and the necessary stream transfer piping can cause higher pressure drops to redistribute flows or dead zones and eddies which can cause extended residence times. These extended residence times can cause fouling, corrosion, erosion, decomposition, formation of undesirable byproducts, and, for example, coke can be deposited when processing carbon-containing streams at elevated temperatures. Furthermore, for MCT heat exchangers to realize their full potential, they must be combined in significant numbers to be scaled up to economic large-scale operations. Thus, owing to having a large number of small MCT heat exchangers in close proximity and the close proximity of one channel to another, manifolding the streams entering and exiting an MCT heat exchanger (or any MCT device) becomes a problem.

The manifold design objective is to provide for acceptably uniform flow through a device with an acceptable manifold geometry and stream mechanical energy losses. See, W. M. Kays and A. L. London, *Compact Heat Exchangers,* 3d ed., at 41 (1984). Restated, manifold design requires tradeoffs among device performance factors as affected by flow uniformity, overall pressure drop, and manifold size and complexity. For example, device performance could be heat transfer performance in the case of endothermic reactions coupled with exothermic reactions within an MCT device. As will be appreciated by those skilled in the art, the manifold design for any given stream is readily approached through application of fluid dynamics. Kays at 41-43.

When manifolding multiple streams in MCT devices, the design problem becomes even greater than designing a two-stream manifold. Having more streams present in a device means proportionally less of the external surface area of that device is available for accessing each stream. The compactness of an MCT device works against the geometric spacing requirements needed to seal manifolds to prevent stream-tostream leakage. The manifold design must, therefore, address both the design objective stated herein above, as well as the limited external surface area.

Heat exchangers are not the only unit operation to benefit from the push toward miniaturization. Closely related, reactors, too, have begun to shrink in size substantially and with excellent results. Wegeng at 9-12 (vaporizers, reforming reactors, and steam reforming). There remain, however, special problems involving MCT reactors and the need for heat transfer. For example, thermal stresses pose significant problems. MCT devices are manufactured and assembled to much higher tolerances than comparable conventional large-scale devices and multiple MCT devices must be closely-packed to economically match the throughput of comparable to large-scale devices. (An MCT device, while producing high output per core unit volume of the device, typically must be combined in very high numbers to provide comparable throughput.) Thus, temperature differentials that could be easily tolerated by a conventional device of greater dimensions can produce unacceptable thermal stresses in an MCT device which is smaller and thus experiences a much higher temperature gradient. Illustratively, an MCT reactor that is overly constrained geometrically either by multiple integral heat exchangers or integrally-combined multiple integral MCT heat exchanger/reactor units can be subjected to potentially destructive thermal stresses. In general, as a result of the increased efficiency of MCT heat exchangers, they exhibit high temperature gradients with corresponding high thermal stresses. To solve this problem, heat exchangers have been "de-coupled" from the reactors to allow for thermal expansion. In doing so, however, separate piping or tubing is required. As a result, as with multiple two-stream MCT heat exchangers, there can be significant heat loss between multiple units to the ambient and through associated piping or tubing. As noted herein above, such piping connections can become sites for fouling and coke-formation problems. Alternatively, more expensive metals that can tolerate the thermal stresses or inexpensive throwaway devices must be employed.

In addition, the goal of combining multiple heat exchanger/reactor devices to provide economically high total throughput has proved to be elusive. See, e.g., O. Woerz, *Microreactors as Tools in Chemical Research*, in Microreaction Technology, IMRET 5: Proceedings of the Fifth International Conference on Microreaction Technology at 385 (Michael Matlosz et al. eds. October 2001) ("In principle, [it is conceivable that microreactors can also be used for production]. However, serious problems would be encountered."). In the petroleum processing industry, for example, even minimally-sized specialty units, for, for example, hydrogen production, typically have a capacity of at least one million standard cubic feet per day (scfd) of hydrogen up to about 100 million scfd of hydrogen. A single-stream MCT device, in contrast, produces, at most, 1,000 to 10,000 scfd of hydrogen. Therefore, to provide comparable throughput, a system must comprise from 100 to up to 100,000 closely-integrated arrays of microchannel units.

The present invention overcomes the drawbacks of the prior art of having to provide multiple two-stream heat exchangers with the necessary inter-unit piping, the inability of integrating an MCT heat exchanger with an MCT reactor, and combining a plurality of integrated MCT heat exchanger/reactor devices to form an MCT system to gain the benefits of large-scale operation, that is, high throughput to equal large-scale operations. In doing so, significant thermal power density with multiple streams is achieved, heat loss to the ambient is reduced, corrosion, erosion, decomposition, and coke formation are reduced or eliminated, and higher throughput per unit volume is attained. In addition, thermal stresses are reduced by operating devices with a monotonically increasing temperature profile.

BRIEF DESCRIPTION OF THE INVENTION

The present invention is a process and device for exchanging heat energy between three or more streams in an MCT heat exchanger, integrating the MCT heat exchanger with an MCT reactor to form an integrated MCT processing unit, combining a plurality of integrated MCT processing units into an integrated MCT processing system, and finally combining a plurality of integrated MCT systems into an MCT processing stack to provide the benefits of large-scale operation. Particularly, the MCT heat exchange process and device enables flexible heat transfer between multiple streams and total heat transfer rates of about 1 Watt (W) or more per core unit volume (cubic centimeters (cc)) (W/cc), pressure drop on the order of about 0.25 psi per in. or less, stream Reynolds Numbers in the transition or laminar zones, and interstream planar heat transfer percents of greater than about 30 percent. In some embodiments, the integrated MCT heat exchanger and MCT reactor exhibits a monotonically increasing temperature profile and, thus, thermal stresses are minimized.

BRIEF DESCRIPTION OF THE DRAWINGS

FIG. 1b is a perspective section view at section 1b-1b of the perspective heat exchanger shown in FIG. 1a.

FIG. 1c is a plan view of the heat exchanger shown in FIG. 1a.

FIG. 3a is a cross-section view of an MCT device having a heat exchange portion and a reaction portion in combination according to the present invention.

FIG. 3b is a cross-section view of an MCT device having a heat exchange portion and a reaction portion in combination having a reverse orientation of the MCT device illustrated in FIG. 3a.

FIG. 4 is a cross-section view of an MCT device having a heat exchange portion and a reaction portion in combination according to a further embodiment of the present invention.

FIG. 7b is a rotated modified negative cutaway perspective view of the MCT processing complex shown in FIG. 7a.

FIG. 8b is a rotated perspective view of the MCT processing stack shown in FIG. 8a.

FIG. 12 shows the Volumetric Flowrates, Outlet Pressures, and Fluid Compositions for Example 1.

FIG. 13 shows the Inlet Temperatures for Example 1.

FIG. 14 shows the Outlet Temperatures for Example 1.

FIG. 15 shows the Pressure Drops for Example 1.

FIG. 16 shows a comparison of a heat exchanger according to the present invention with a computer simulation.

NUMERALS

Figure 1A:
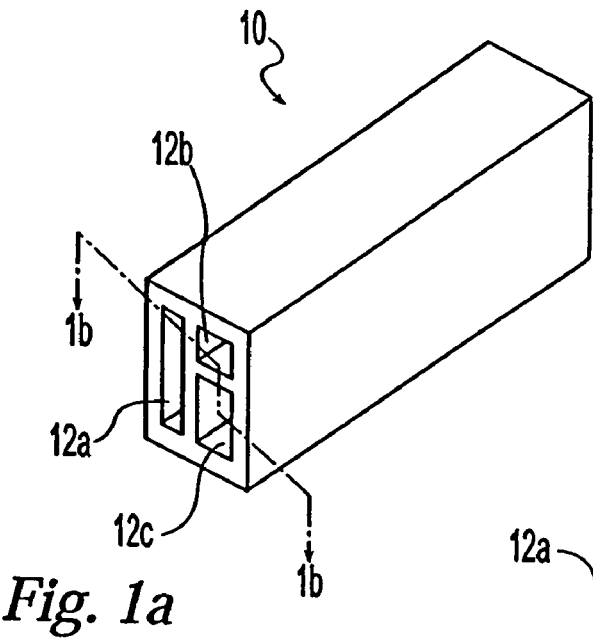
FIG. 1a is a perspective view of a heat exchanger according to the present invention.

10 MCT heat exchanger
11a First wall
11b Second wall
12a First microchannel
12b Second microchannel
12c Third microchannel
14 Length
15a Height of microchannel 12a
15b Width of microchannel 12a
16a Height of microchannel 12b
16b Width of microchannel 12b
17a Height of microchannel 12c
17b Width of microchannel 12c
18 Height of first wall 11a
19 Width of second wall 11b
16 Height
18 Width
20 First fluid stream
22 Second fluid stream
24 Third fluid stream
30 MCT heat exchanger
32a First microchannel
32b Second microchannel
32c Third microchannel
33 Rib
34 First side
36 Second side
38 Third side
40 Fourth side
42 First fluid stream
44 Second fluid stream
46 Third fluid stream
50 MCT processing unit
52 Reactor microchannel
54 First reactor heat exchange microchannel
56 Reaction microchannel
58 Second reactor heat exchange microchannel
60 Reaction catalyst
62 Combustor microchannel
64 First combustor heat exchange microchannel
66 Combustion microchannel
68 Second combustor heat exchange microchannel
70 Combustion catalyst
72 Oxidizer microchannel
74 Aperture
75 Reactants stream
76 Products stream
77 Fuel stream
78 Oxidizer stream
79 Exhaust stream
80 MCT processing unit
82 Reactor microchannel
84 First reactor heat exchange microchannel
86 Reaction microchannel
88 Second reactor heat exchange microchannel
90 Reaction catalyst
92 Combustor microchannel
94 First combustor heat exchange microchannel
96 Combustion microchannel
98 Second combustor heat exchange microchannel
100 Combustion catalyst
102 Oxidizer microchannel
104 Aperture
110 MCT processing system
111 MCT processing unit
112 First reactor microchannel
113 Second reactor microchannel
114 First reactor heat exchange microchannel
115 Second reactor heat exchange microchannel
116 First reaction microchannel
117 Second reaction microchannel
118 Third reactor heat exchange microchannel
120 Reaction catalyst
122 First combustor microchannel
123 Second combustor microchannel
124 First combustor heat exchange microchannel
125 Second combustor heat exchange microchannel
126 First combustion microchannel
127 Second combustion microchannel
128 Third combustor heat exchange microchannel
130 Combustion catalyst
132 First oxidizer microchannel
133 Second oxidizer microchannel
134 Aperture
136 First termination microchannel
138 Second termination microchannel
140 Reactor microchannel tongue
142 Combustor microchannel tongue
210 MCT processing complex
212 First reactants manifold
213 First reactants manifold stub
213a Reactants flue
214 Second reactants manifold
215 Second reactants manifold stub
216 Products manifold
217 Products manifold stub
217a Products flue
218 First fuel manifold
219 First fuel manifold stub 219a Fuel flue
220 Second fuel manifold
221 Second fuel manifold stub
222 First oxidizer manifold
223 First oxidizer manifold stub
223a Oxidizer flue
224 Second oxidizer manifold
225 Second oxidizer manifold stub
310 MCT processing stack
312 Reactants header
314 Products header
316 Fuel header
318 Oxidizer header
320 Exhaust header

DETAILED DESCRIPTION OF THE INVENTION AND BEST MODE

The term "millichannel" refers to a channel having at least one internal dimension of width or height of up to about 10 mm.

The term "microchannel" refers to a channel having at least one internal dimension of width or height of up to about 2 mm, and in one embodiment from about 0.1 mm to about 2 mm, and in one embodiment from about 0.1 mm to about 1 mm. The length may be up to about 5 meters (m) or more. Preferably, the length is about 1 m or less. More preferably the length is about 0.5 m or less. A microchannel is also a milli-channel.

A millichannel may be used in an apparatus in conjunction with microchannels for both heat exchanger applications and for combined heat exchange and reactor applications. The milli-channel offers the advantage of reduced pressure drop, but the disadvantage of lower heat transfer coefficients and surface area, including IPHTAP-type area. There are examples of when a process is advantaged by the inclusion of a milli-channel with microchannels for multiple fluid processing streams. As one example, if a relatively large fraction of heat greater than 70 percent were desired to be transferred from Fluid A to Fluid B and a much smaller fraction of heat from Fluid A to Fluid C in a single apparatus, then the Fluid C channels may be made in the milli-channel range. Combined exchanger and reactor applications may be advantaged by the inclusion of one or fluid milli-channel. As an example, in the limit of a very low pressure drop constraint on one or more fluids, such as combustion air, this channel may be designed in the milli-channel range. A very low pressure drop requirement for one fluid in a heat exchanger application may necessitate the use of a milli-channel. As one example, a process that utilized natural gas to provide home heating or power would be required to not exceed the allowable back pressure on the feed line, typically a few psi. Another advantage of a combined milli-channel and microchannel process is the combined application of homogeneous combustion with additional heat exchangers to preheat and recover heat. Heat recovery from combustion may take the form of heating water for portable or stationary applications. Homogeneous combustion is challenging in a microchannel for many hydrocarbon fuels, as the critical hydrocarbon quench diameter is often larger than a microchannel but well below the limits of a milli-channel. As an example, the quench diameter of methane exceeds 2 mm at room temperature and would not ignite in a microchannel. As the critical dimension increases from the microchannel range out to the broader milli-channel range, the overall size of the device may grow larger. For some applications, this is not disadvantageous if there are no space limitations. It will be appreciated by one skilled in the art, that many applications could be advantaged through the combinations of microchannels and milli-channels to tailor the performance of a process to meet desired specifications.

The term "microchannel" or "MCT" when applied to a device, process, system, or the like, means that such device, process, or system includes at least one microchannel.

The term "MCT processing unit" refers to a microchannel device having at least one reactor section and at least one heat exchanger section in combination.

The term "MCT processing system" refers to a plurality of MCT processing units in combination.

The term "MCT processing complex" refers to a plurality of MCT processing systems in combination.

The term "MCT processing stack" refers to a plurality of MCT processing complexes in combination.

Figure 1B:
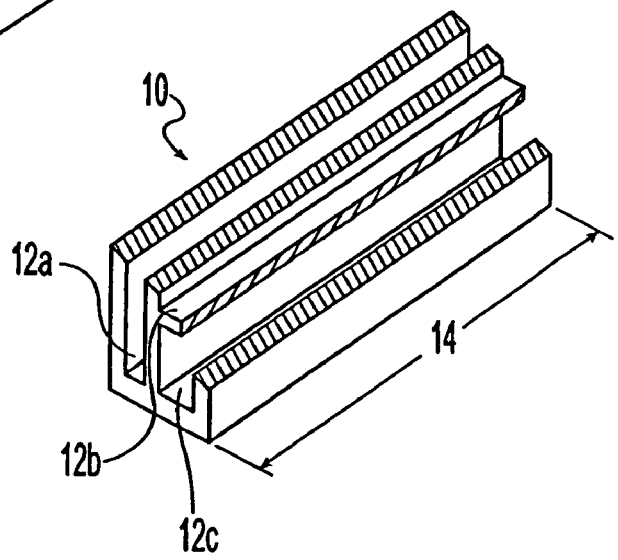
Figure 1C:
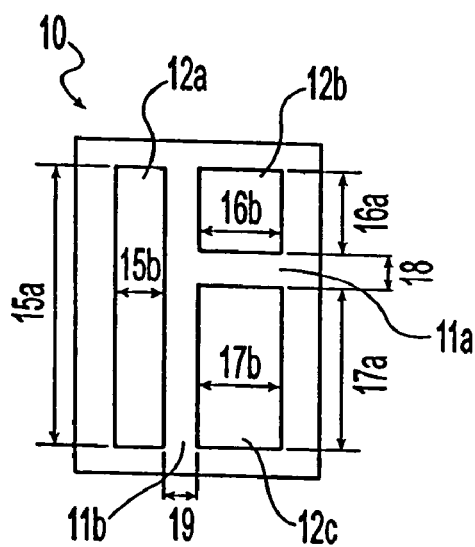

The term "total core volume V" refers to the sum total volume of microchannels plus the volume of walls separating the microchannels, but specifically excluding any volume defined by any manifolds or headers. Thus, outside walls which define the outer dimensions of the device, are not included. Referring to FIGS. 1a and 1b, by way of example only, the total core volume V of the device shown would be computed as follows:

$$V = [(\text{height } 15a) * (\text{width } 15b) + (\text{height } 16a) * (\text{width } 16b) + (\text{height } 17a) * (\text{width } 17b) + (\text{height } 18) * (\text{width } 17b) + (\text{height } 15a) * (\text{width } 19)] * [\text{length } 14]$$

As will be understood by those skilled in the art, the total core volume V will be calculated based upon generally accepted principles of solid geometry and different configurations may be approached in different manners.

The term "total thermal power density" refers to the amount of heat gained by the cold stream(s) divided by the total core volume V.

Figure 18:
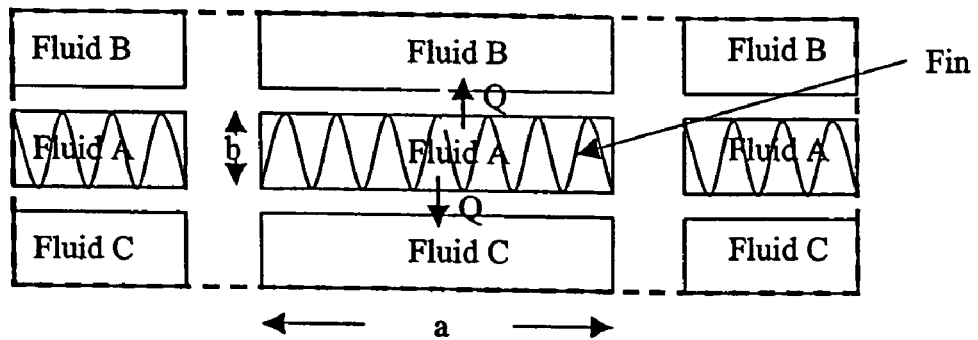
FIG. 18 shows an arrangement of channels exchanging heat wherein one fluid flows through a channel with heat enhancement fins.
Figure 19:
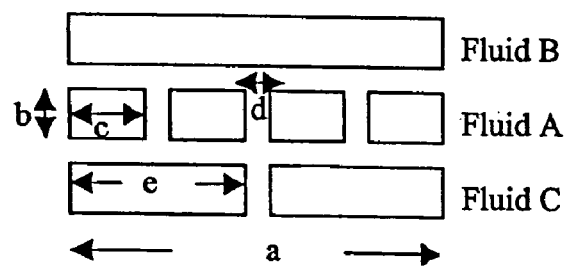
FIG. 19 shows an arrangement of microchannels exchanging heat with no heat enhancement fins.

The term "interstream planar heat transfer area percent" (IPHTAP) relates to the highest effective heat transfer and refers to the surface area that separates two fluids exchanging heat in a channel device excluding ribs, fins, and surface area enhancers as a percent of the total interior surface area of a channel that also includes ribs, fins, and surface area enhancers. That is, the ratio of the area through which heat is transferred to neighboring channels with a different fluid flowing to the total surface area of the channel. Referring to FIG. 18, an arrangement of channels is shown exchanging heat; there are three fluids, Fluid A, Fluid B, and Fluid C. Fluid A exchanges heat with Fluid B and with Fluid C. Channel A comprises heat enhancement fins (N/in.) as shown in FIG. 18. IPHTAP is calculated as $[2a/(2a+2b+2c)]*100$. In a typical compact heat exchanger, where a=2.0 in., b=0.5 in., and N=20 fins/in., IPHTAP equals 16 percent. A geometry with IPHTAP=100 percent would signify that all available area is utilized for exchanging heat with neighboring different streams. This example assumes that heat exchange at both long edges of the channel. If the channel is an end channel and exchanges heat at only one edge, IPHTAP=8 percent. In a microchannel, in contrast (FIG. 19), where a=2.0 in., b=0.025 in., d=0.040 in. and e=0.98 in., IPHTAP would be: Channel with Fluid A=$[2a/(2a+2b)]*100$=49 percent; Channel with Fluid B=$[8c/(8c+8b)]*100$=95 percent; Channel with Fluid C=$[2e/(4e+4b)]*100$=49 percent.

When used in this Specification, the terms "reactor", "reaction", "combustor", "combustion", "oxidizer", and the like, when referring to microchannels and streams, are nominal only. It is to be understood that, within the scope and spirit of the present invention, no reaction or any reaction and no combustion or any similar combustion or exothermic reaction may take place within such named microchannels. By way of example only, reactions may include catalytic processes such as acetylation, addition reactions, alkylation, dealkylation, hydrodealkylation, reductive alkylation, amination, aromatization, arylation, autothermal reforming, carbonylation, decarbonylation, reductive carbonylation, carboxylation, reductive carboxylation, reductive coupling, condensation, cracking, hydrocracking, cyclization, cyclooligomerization, dehalogenation, dimerization, epoxidation, esterification, exchange, Fischer-Tropsch, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating, hydrodesulferization/hydrodenitrogenation (HDS/HDN), isomerization, methanation, methanol synthesis, methylation, demethylation, metathesis, nitration, oxidation, partial oxidation, polymerization, reduction, Sabatier reaction, steam and carbon dioxide reforming, sulfonation, telomerization, transesterification, trimerization, water gas shift (WGS), and reverse water gas shift (RWGS). By further example, phase changes such as condensation and evaporation are also within the contemplation of the present invention, as are operations such as absorption and adsorption.

Figure 1D:
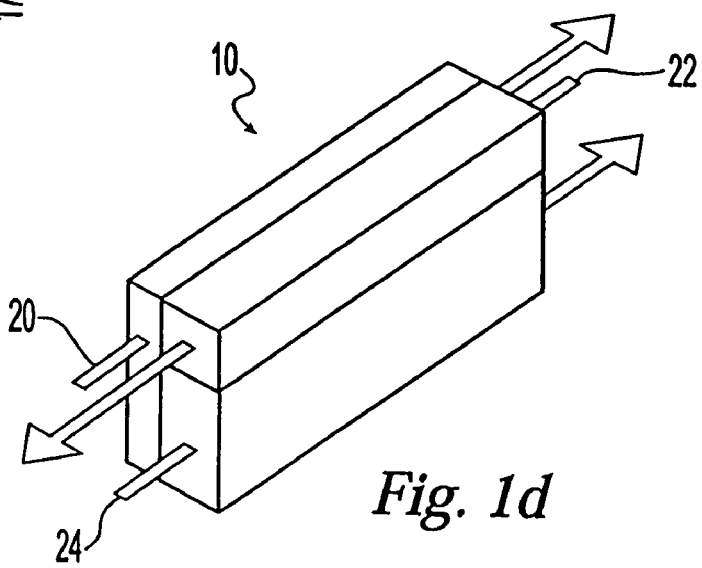
FIG. 1d is a schematic perspective view of the heat exchanger shown in FIG. 1a illustrating counter-/co-flow operation.

Referring initially to FIGS. 1a-1d, the MCT heat exchanger 10 of the present invention has a total core volume V and comprises a first microchannel 12a, a second microchannel 12b, and at least a third microchannel 12c. In operation, a first stream 20, a second stream 22, and at least a third stream 24 flow through the first microchannel 12a, the second microchannel 12b, and the at least third microchannel 12c, respectively. While FIG. 1d illustrates a single-pass, parallel counter/co-current flow pattern, it will be understood by those skilled in the art that the flow pattern may be any of suitable design. Multiple pass flows as well as co-current and cross-current flow patterns (shown in FIGS. 2a-2c) are possible. Importantly, the total thermal power densities of such devices can be from about one (1) W/cc to 40 W/cc or more, the total pressure drop can be 0.25 psi per in. or less, and the inter-stream planar heat transfer area percent greater than 10 percent. Particular attention is drawn to the shapes, sizes, and separations of the first microchannel 12a, the second microchannel 12b, and the at least third microchannel 12c. By varying the dimensions and overall design format of the microchannel layout and the walls separating the microchannels, the flow of heat energy between streams can be varied virtually infinitely. It is also possible to provide a higher heat transfer rate per unit volume, less metal between microchannels is required, and a higher heat transfer coefficient per hydraulic diameter. Thus, $h \sim f(D_h)$, where h is the heat transfer coefficient, $D_h$ is the hydraulic diameter, and $D_h = 4A/P$, where A is the cross-sectional area and P is the wetted perimeter.

As is shown, for example, in FIG. 16, heat transfer coefficients, h, increase as the hydraulic diameter, $D_h$, decreases.

Consider, first, the overall size of the device; the width, length, and height. A larger overall size leads to higher total heat capacities and less relative heat loss ($Q_{loss}/Q_{total}$) but also leads to difficulties in manifolding and flow distribution. In a counter-current flow heat exchanger, a larger heat exchanger length gives a smaller average approach temperature between the hot and cold streams. That is, $T_{hot-exit-mean} - T_{cold-inlet-mean}$.

However, a smaller approach temperature also indicates lower transversal heat flux between the streams. Consider, next, the thermal properties of the device; including the thermal conductivity, specific heat, and density. A higher thermal conductivity gives a higher transversal heat transfer rate but also higher longitudinal heat conduction. The former will enhance the heat transfer between the streams in adjacent channels. The latter is undesirable because it degrades the heat exchange performance due to larger approach temperatures. An optimal thermal conductivity for a given structure and dimensions for microchannel heat exchangers can be determined. See, e.g., T. Stief et al., *Numerical Investigations on Optimal Heat Conductivity in Micro Heat Exchangers*, AIChE 2000 Spring Meeting (Mar. 2-9, 2000). Larger specific heats and densities lead to higher thermal inertia and, therefore, a slow transition of operation statuses, for example start-up and shut-down. Consider, next, the total flow rate, or capacity, of an individual stream. The increase in flow rate generally leads to a smaller temperature drop of a hot stream (or to a smaller increase in temperature of a cold stream) throughout the exchanger. This also means that the overall approach temperature of all the streams will increase. If the flow rates of other streams remain unchanged, the local heat flux will increase by increasing the flow rate of one stream. A decrease in the microchannel dimension leads to an increase in the heat transfer coefficient and, in turn, the heat flux between the fluid in the microchannel and the microchannel wall. For a cold stream, its exit temperature becomes higher, for the same mass flux, than it was before reducing the size of the microchannel dimension. The overall thermal effectiveness is increased because the amount of heat transferred from or to the other streams also increases. However, the increase in the amount of heat transferred from or to the other streams is generally smaller than that of the stream whose microchannel dimension is reduced. There is, however, a practical lower limit since the lower the microchannel dimension, the higher the pressure drop. In the present invention, a microchannel having a rectangular cross-section is preferred as this geometry gives higher heat transfer coefficients and less solid material is required than with a square or round channel. Particularly, very wide microchannels with a very small microchannels can nearly isolate a particular stream from thermal communication with other streams. A spacer or rib in, or between streams, may function as a fin to improve the heat transfer between the stream and the solid wall and, in turn, improve the heat transfer to other streams. This effect is also found in ribs, webs, and spacers between different streams at temperatures lower than local wall temperatures. However, one of the effects of increasing the dimensions of webs, ribs, spacers, and perimeter metal is to increase the unwanted metal cross-sectional area and, in turn, the axial conduction. Another effect of increasing dimensions of webs between different streams is to increase the resistance of transverse heat conduction when heat transfer between the two streams is desired. These two effects decrease the transverse heat flux between different streams and, therefore, degrade the heat exchange performance.

As will be appreciated by those skilled in the art, the choice of microchannel cross-section is not limited to rectangular; other polygonal and even circular or elliptical cross-sections can be used within the scope of the present invention.

Figure 2A:
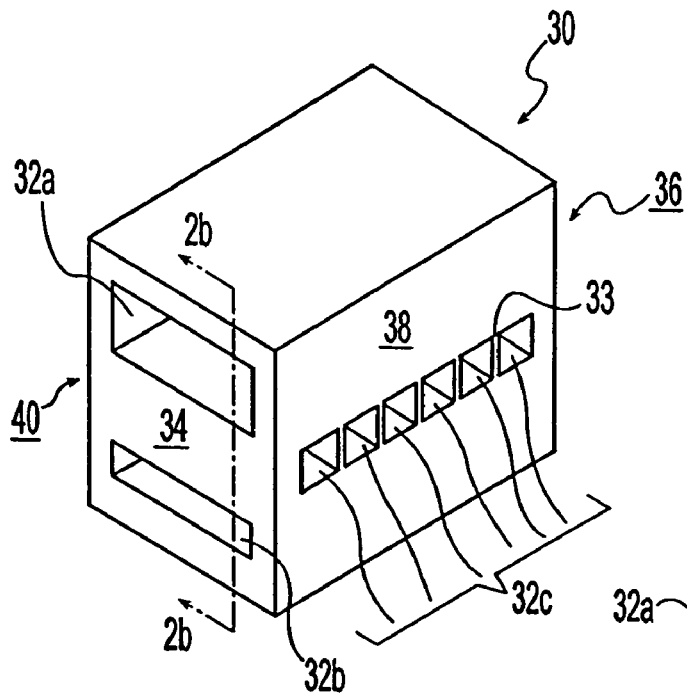
FIG. 2a is a perspective view of a cross-flow heat exchanger according to a further embodiment of the present invention.
Figure 2B:
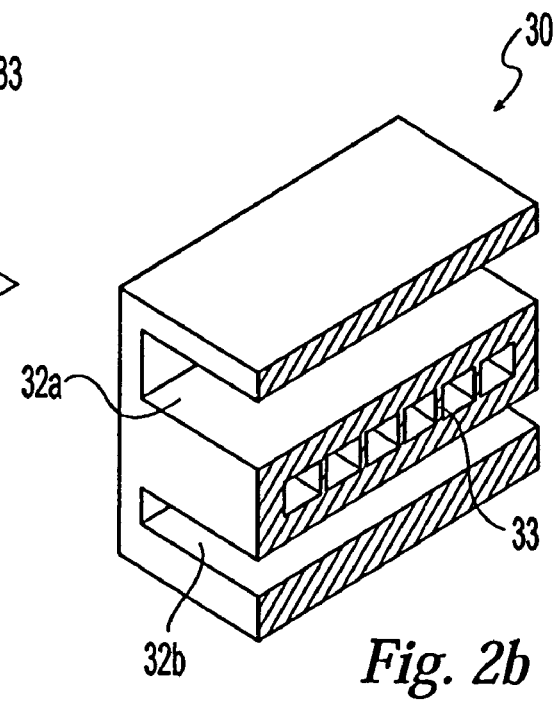
FIG. 2b is a perspective section view of the cross-flow heat exchanger shown in FIG. 2a at section 2b-2b.
Figure 2C:
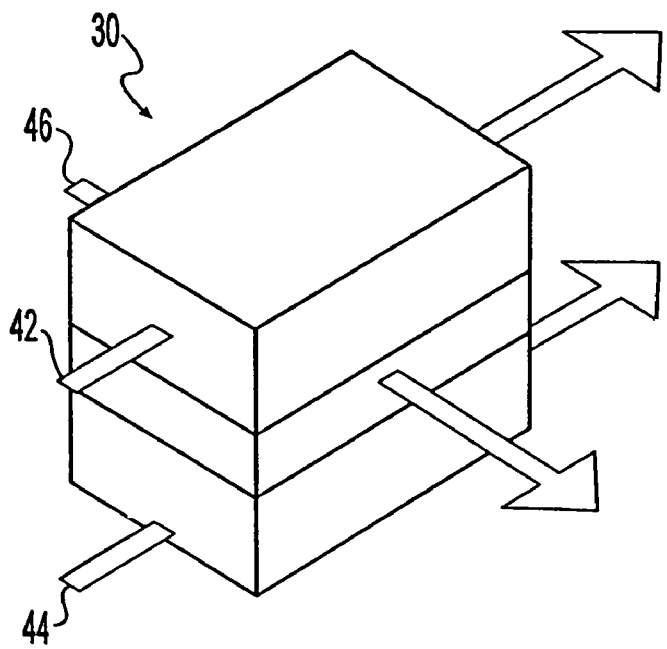
FIG. 2c is a schematic perspective view of the cross-flow heat exchanger shown in FIG. 2a illustrating co-/cross-flow operation.

Referring now to FIGS. 2a-2c, in another embodiment of the present invention, an MCT heat exchanger has at least four surfaces 34, 36 (indicated but not shown), 38, and 40 (indicated but not shown), and comprises a first microchannel 32a, a second microchannel 32b, and at least a third microchannel 32c. In operation, a first stream 42, a second stream 44, and at least a third stream 46 flow through the first microchannel 32a, the second microchannel 32b, and the at least third microchannel 32c, respectively. Illustratively, the third microchannel 32c may further comprise a plurality of interior walls or ribs 33. As will be appreciated by those skilled in the art, the ribs 33 introduce significant design flexibility and allow a virtually limitless combination of hydraulic diameters. In addition, the ribs 33 can, in appropriate circumstances, help provide additional structural support when dealing with pressure differentials across the walls separating one microchannel from another. While FIGS. 2a-2c illustrate a single-pass flow pattern, it will be understood by those skilled in the art that the flow pattern may be of any suitable design. In addition, one skilled in the art will appreciate that the angles between the faces need not be exact right angles as shown; many other angles will be effective depending upon the application. Importantly, however, the total thermal power density of such devices can be about 21 W/cc to 40 W/cc or more.

As will be further appreciated by those skilled in the art, the usefulness of the present invention is not limited to the specific configurations illustrated in FIGS. 1a-1d and 2a-2c. By way of example only, the various microchannels may vary in number, size, and complexity. The relative positions of one microchannel to other microchannels may also be varied as may the thickness as well as the inherent thermal conductivity of the walls separating one microchannel from the other microchannels. See discussion herein above.

EXAMPLE 1

Figure 10:
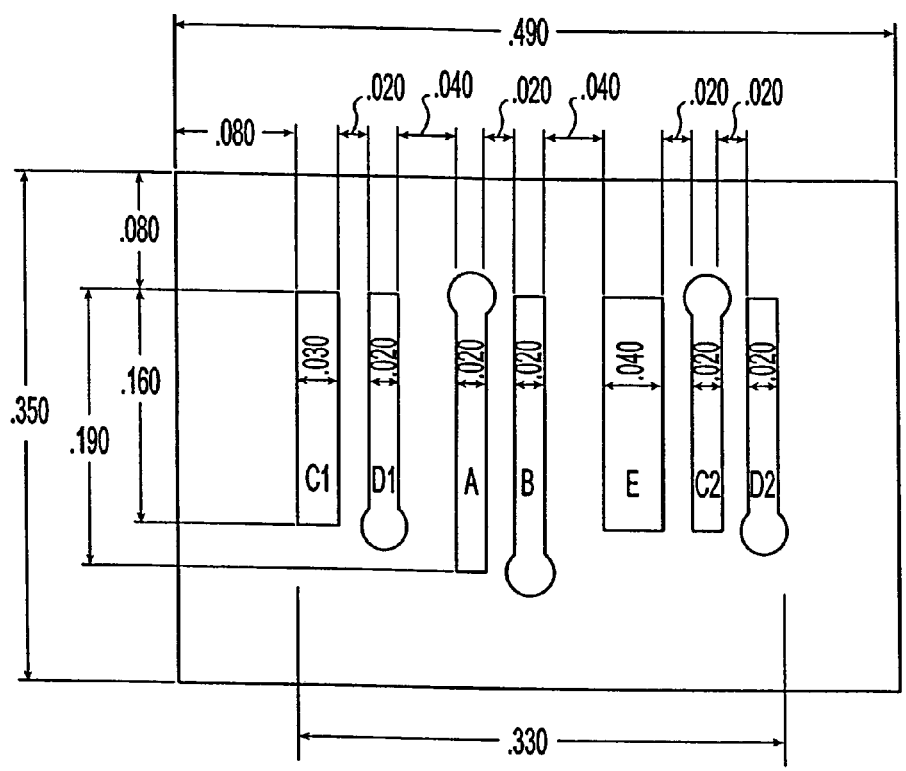
FIG. 10 is a plan view of the heat exchanger described in Example 1.

Referring now to FIGS. 10-15, a heat exchanger was specifically designed to simulate a heat exchanger according to one embodiment of the present invention. The heat exchanger used five distinct fluids, denoted in FIGS. 10-15 as Fluids A, B, C, D, and E. Fluids C and D were split into two streams each with each stream flowing through separate microchannels; fluids A, B, and E each flowed through separate microchannels (as Streams A, B, and E, respectively), making a total of seven microchannels in the heat exchanger. As shown in FIG. 10, Fluid C flowed through two microchannels as Stream C1 and Stream C2. Similarly, Fluid D flowed through two microchannels as Stream D1 and D2. The experimental results show the performance of the heat exchanger and the results as compared to numerical simulations from a computer program.

Referring again to FIG. 10, the heat exchanger consisted of seven rectangular microchannels, each ten inches (in.) long. The height of each microchannel where Streams A and B flowed was 0.020 in. The height of the microchannel where Stream E flowed was 0.040 in. The height of each microchannel where Stream D1 and Stream D2 flowed was 0.020 in., and the heights of the microchannels where Streams C1 and C2 flowed were 0.030 in. and 0.020 in., respectively. The order of the seven streams in the heat exchanger was C1, D1, A, B, E, C2, and D2 (shown in FIG. 10). (For clarity and consistency, the heat exchanger microchannels are referred to by the name of the stream flowing through them. Thus, Stream C1 flows through microchannel C1.)

The heat exchanger was constructed of Inconel 625 and the microchannels were made by "popping" a 0.030-in. diameter hole with an electrode in the places where the rectangular microchannels were needed. After the holes were made, microchannels were made by using wire ElectroDischarge Machining (EDM). If the microchannel width was less than 0.030 in., the edge portions of the original round hole still existed around the outside of the microchannel; the portions of the original hole were purposely, alternatingly, offset to the top and bottom of the microchannels. If the microchannel width was equal to or greater than 0.030 in., no portions of the round hole remained.

Figure 11A:
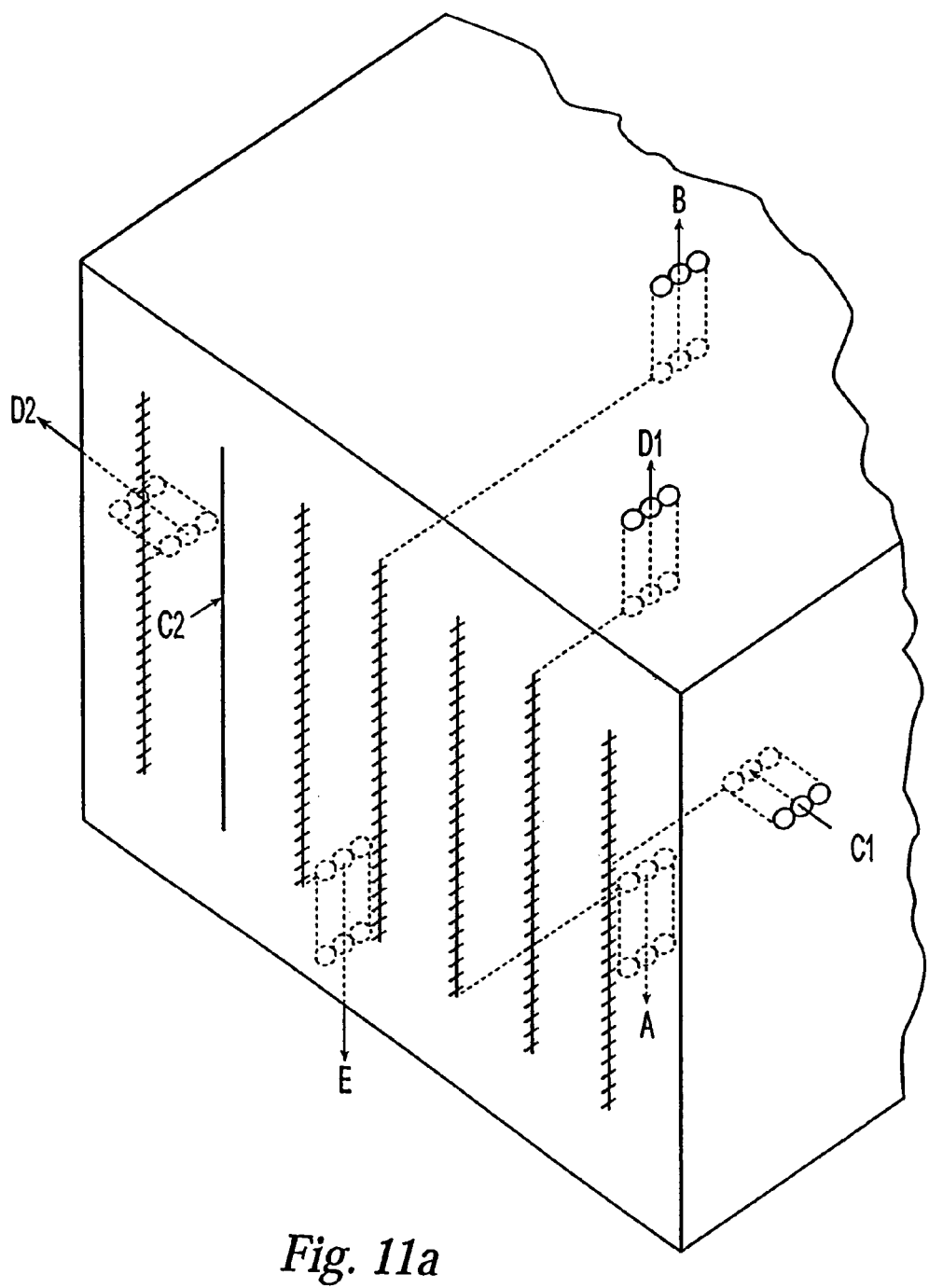
FIG. 11a is a perspective view of a first end of the heat exchanger described in Example 1.
Figure 11B:
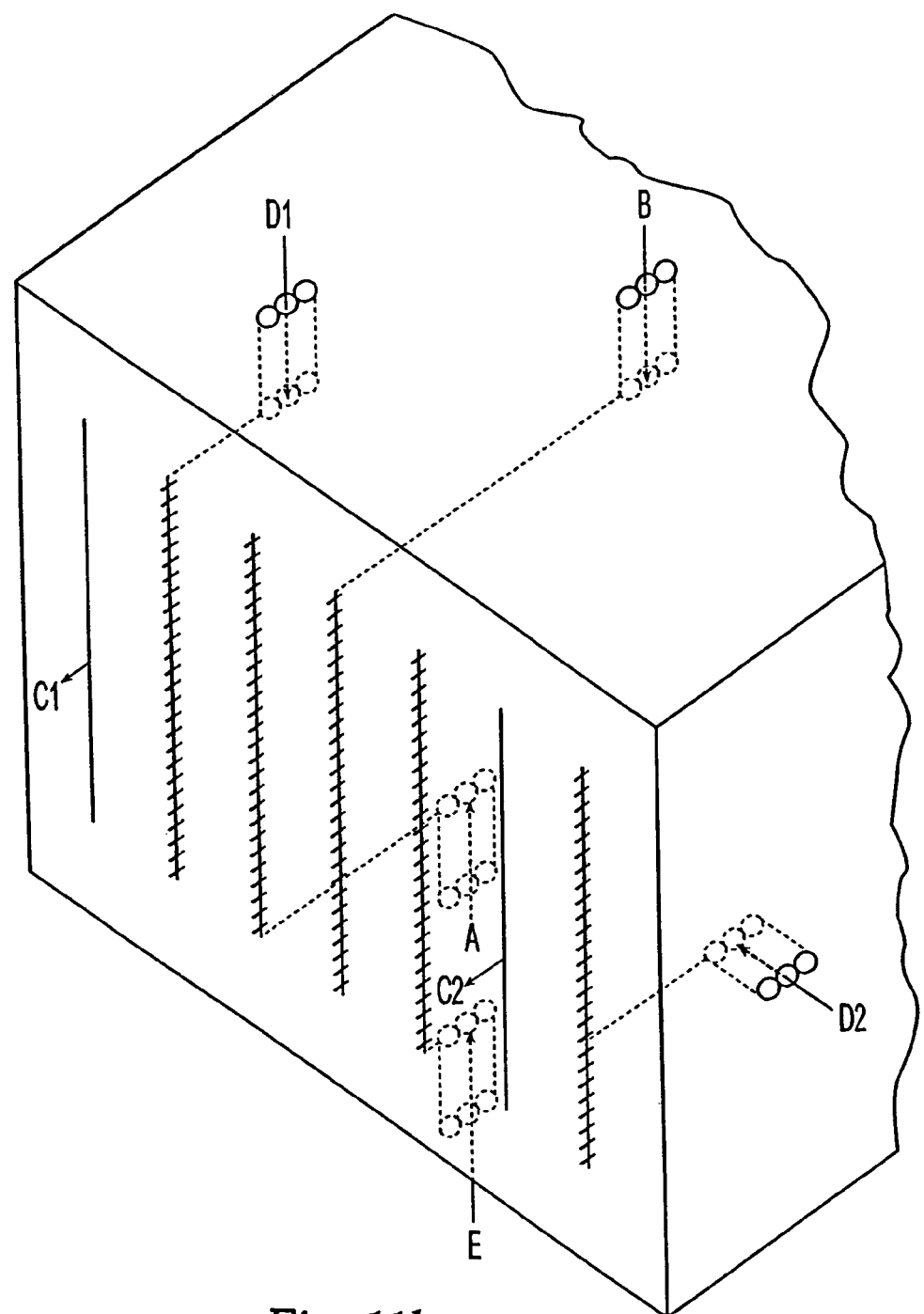
FIG. 11b is a perspective view of a second end of the heat exchanger described in Example 1.
Figure 17:
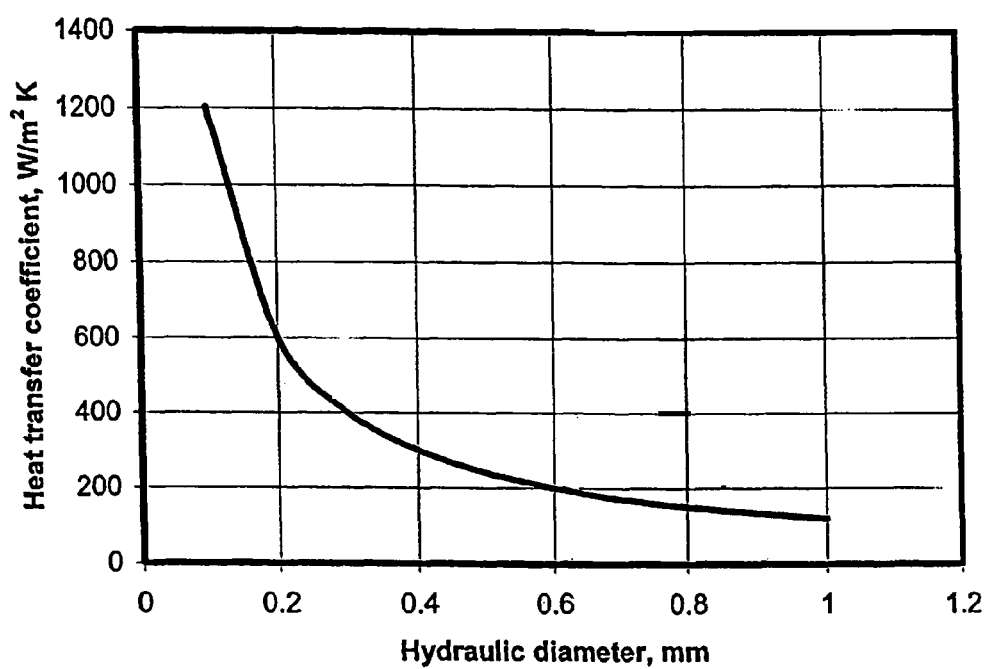
FIG. 17 shows the relationship of hydraulic diameter to heat transfer coefficient.

Referring to FIGS. 11a and 11b, manifolding for the inlet of Microchannel C2 was accomplished by sending Stream C2 directly into the device while manifolding for the outlet of Microchannel C1 was accomplished by exiting Stream C1 directly out from the device; the other microchannels were blocked off by welding the microchannels closed on the front and back faces. The inlet to Microchannel C1 was manifolded by drilling in through the side of the heat exchanger. The outlet from Microchannel C1 came directly out of the heat exchanger similar to Microchannel C2. Microchannel D2 on the edge of the heat exchanger was also manifolded in and out of the side of the heat exchanger. The other microchannels in the center of the heat exchanger were manifolded in the top and bottom of the heat exchanger. The diameter of the inlet and outlet holes was equal to or smaller than the width of the channel, i.e., 0.020 in. to 0.040 in. Generally, three or four holes that served as the inlet or exit were drilled into each such microchannel.

The exact composition and flowrates of each of the streams for each test are shown in FIG. 12. Experiments were performed with flowrates corresponding to six conditions. The first two conditions were nearly equivalent except that the reactant and product streams entered the heat exchanger at approximately one-half the expected pressure.

Experiments were performed at the temperatures and pressures shown in FIGS. 12 and 13. The directions of the streams are shown in FIGS. 11a and 11b. Streams A, C1, C2 flow in the same direction and counter-current to the flow of Streams B, D1, D2, and E.

There were three sets of experimental tests performed for the heat exchanger; Tests X, Y, and Z as shown in FIGS. 12-15. The pressure drops of some of the streams are shown in FIG. 15; all pressure drops were measured before and after the fluid entered and exited the microchannel, therefore contraction and expansion losses are included in the measured pressure losses. The pressure losses of the individual streams were measured with differential pressure gauges, most of which measured a maximum differential pressure of 5.4 psi and a resolution of 0.1 psi. The stream labeled D1 was measured with a meter capable of measuring 9.0 psi and a resolution of 0.2 psi.

The five-stream heat exchanger demonstrated that a multi-stream microchannel heat exchanger could successfully heat and cool multiple streams in a single device. There was reasonable agreement with a numerical simulation that was constructed. The comparison between the experimental values and the results from the numerical simulation are shown in FIG. 16. The inlet temperatures were fixed and the outlet temperatures calculated.

An approach temperature was also calculated:

$$T_m = \frac{\sum_{i=1}^{n} T_i \cdot m_i \cdot Cp_i}{\sum_{i=1}^{n} m_i \cdot Cp_i},$$

where $T_m$ is the mean temperature of the hot streams at a first end of the heat exchanger and is also used to calculate the mean temperature of the cold streams at the first end, the mean temperature of the hot streams at the second end, and the mean temperature of the cold streams at the second end. $T_i$ is the ith hot stream, $m_i$ is the mass flow rate (kg/s) of the ith hot stream, $Cp_i$ is the heat capacity of the ith hot stream. The mean temperature of the hot streams at the first end was 857 deg. C. and at the second end 250 deg. C. The mean temperature of cold streams at the first end 730 deg. C. and at the second end 161 deg. C. The mean approach temperatures are: 126 deg. C. at the first end and 89 deg. C. at the second end.

Referring now to FIG. 3a, in another embodiment of the present invention, an MCT processing unit 50 has a total core volume V (not shown) and comprises a reactor microchannel 52, a combustor microchannel 62, and an oxidizer microchannel 72. The reactor microchannel 52 comprises a first reactor heat exchange microchannel 54, a reaction microchannel 56, and a second reactor heat exchange microchannel 58. Alternatively, only one reactor heat exchange microchannel may be present. Also, as will be understood by those skilled in the art, the precise point where the reactor microchannel 52 is no longer primarily exchanging heat and is functioning primarily as a reactor can be difficult to determine and can be somewhat arbitrary. For example, the reactor microchannel 52 may be in thermal communication with one or more other microchannels in the same unit. The reaction microchannel 56 may further include a reaction catalyst 60. The reaction catalyst 60 may contain any suitable metal or semi-metal and/or their oxides comprising one or more elements from Groups IIIA, IVA, VA, VIIA, VIIIA, IB, IIB, IIIB, IVB, Ce, Pr, Sm, Tb, Th or their oxides and combinations thereof. The reaction catalyst 60 may also contain promoters which enhance the chemical or physical properties of the reaction catalyst 60, and may contain any suitable metal, semi-metal or non-metal, and/or their oxides, comprising one or more elements from the previous list and/or Group IA, IIA, VB, VIB and combinations thereof. The reaction catalyst 60 may also be supported on any suitable support material, such as silica, alumina, zirconia, titania, magnesia, yttria, ceria, lanthana, carbon or combinations of these, which supply either sufficient surface area or chemical interaction to benefit the action of the active constituent. The reaction catalyst 60, by way of example only, may be applied to an engineered substrate such as a felt, foam, fin, mesh, gauze, or foil and the substrate inserted into a cutout (not shown) in a wall of the reaction microchannel 56 to act as a flow-by catalyst, may be inserted into the reaction microchannel 56 to act as a flow-through catalyst, or may be applied to a wall or walls of the reaction microchannel 56 as a washcoat. Thus, the reaction catalyst 60 may be present in the form of a powder or small pellet, a monolith, a wall coating or combinations of these forms. In the case of powders and monoliths, the reaction catalyst 60 may be comprised of a skeletal, or Raney type, metal. In the case of a monolith, the reaction catalyst 60 may be present as a slurry or wash coating on a foam, felt, screen, mesh, gauze or similar substrate. In the case of a wall coating, the reaction catalyst 60 may be applied as by slurry coating or direct wash coating, preferably with prior treatment of the wall in such a way as to maximize adhesion and/or surface area. In some cases, constituents of the reaction catalyst 60 may be comprised wholly or partially from native materials present in the wall or monolith alloys. The reaction catalyst 60 may also include two or more different catalyst types in different regions of the reaction microchannel 56. Alternatively, depending upon the desired reaction, the reaction microchannel 56 may include no reaction catalyst 60. Finally, there may be no reaction in reaction microchannel 56, for example, when vaporizing a liquid stream.

The combustor microchannel 62 comprises a first combustor heat exchange microchannel 64, a combustion microchannel 66, and a second combustor heat exchange microchannel 68. As with the reactor microchannel 52, alternatively, only one combustor heat exchange microchannel may be present. Also, as with the reactor microchannel 52, as will be understood by those skilled in the art, the precise point where the combustor microchannel 62 is no longer primarily exchanging heat and is functioning primarily as a combustor can be difficult to determine and somewhat arbitrary. And, in fact, combustion and significant heat exchange can, and does, occur in the same region of the combustor microchannel 62. For example, the combustor microchannel 62 may be in thermal communication with one or more other microchannels in the same device. The combustion microchannel 66 may also include a combustion catalyst 70. To provide further flexibility, the first combustor heat exchange microchannel 64 and the second heat exchange microchannel 68 may also include a combustion catalyst 70 to provide pre- and post-oxidation reactions. The combustion catalyst may contain any suitable active metal and/or metal oxide, preferably comprising one or more elements from Groups IIIA, VIIIA or IB, Ce, Pr, Sm or their oxides and combination thereof, or more preferably comprising one or more of the elements Pt, Pd, Y, La, Ce, Pr or their oxides, and combinations thereof. The combustion catalyst 70 may also be supported on any suitable support material, such as silica, alumina, zirconia, titania, magnesia, yttria, ceria, lanthana, carbon or combinations thereof, which supply either sufficient surface area or chemical interaction to benefit the action of the active constituent. The combustion catalyst 70 may be present in the form of a powder or small pellet, a monolith, a wall coating or combinations of these forms. In the case of powders and monoliths, the combustion catalyst 70 may be comprised of a skeletal, or Raney type, metal. In the case of a monolith, the combustion catalyst 70 may be present as a slurry or wash coating on a foam, felt, screen, mesh, gauze or similar substrate. In the case of a wall coating, the combustion catalyst 70 may be applied as by slurry coating or direct wash coating, preferably with prior treatment of the wall in such a way as to maximize adhesion and/or surface area. In some cases, constituents of the combustion catalyst 70 may be comprised wholly or partially of native materials present in the wall or monolith alloys. Alternatively, depending upon the desired combustion, the combustion microchannel 66, the first combustor heat exchange microchannel 64, and the second combustor heat exchange microchannel 68 may include no combustion catalyst 70. As will be appreciated by those skilled in the art, combustion may be replaced with any number of exothermic reactions. By way of example only, acetylation, alkylation, hydrodealkylation, epoxidation, Fischer-Tropsch, hydration, dehydration, hydrogenation, oxidative dehydrogenation, hydrolysis, methanation, methanol synthesis, metathesis, oxidation, polymerization, and water-gas shift (WGS).

The oxidizer microchannel 72 comprises one or more apertures 74 through which the oxidizer microchannel 72 is in fluid communication with the combustor microchannel 62. As with the combustor microchannel 62, the oxidizer microchannel 72 may provide for the introduction of other reactants to an exothermic reaction.

In operation, by way of example only, a reactants stream 75, such as a mixture of steam and methane, is introduced into the reactor microchannel 52 at the first reactor heat exchange microchannel 54. A fuel stream 77, such as hydrogen or methane or other hydrocarbon, is introduced into the combustor microchannel 62 at the first combustor heat exchange microchannel 64, and an oxidizer stream 78, such as air, is introduced into the oxidizer microchannel 72. As the reactants stream 75 flows through the reaction microchannel 56 it is converted, for example, in a reforming reaction, to the products stream 58, such as a mixture of steam, methane, and hydrogen. A reaction catalyst 60 is used. As the fuel stream 77 flows through the first combustor heat exchange microchannel 64 and the combustion microchannel 66, it becomes combined with oxidizer 78 introduced into the oxidizer microchannel 72 and thus into the combustor microchannel 64 via the one or more apertures 74, and combusts to form the exhaust stream 79. A combustion catalyst 70 may be used. Note that pre-oxidation may occur in the first combustor heat exchange microchannel 64 to preheat the reactants stream 75. Likewise, oxidation may continue into the second combustor heat exchange microchannel 68 to provide additional heat energy downstream of the combustion microchannel 66. By further example only, the reaction converting the reactants stream 75 into the products stream 76 is an endothermic reaction such as steam methane reforming or hydrocarbon dehydrogenation, the fuel stream 77 is hydrogen or a combination of carbonaceous fuels, and the oxidizer stream 78 is air.

As will be appreciated by those skilled in the art, the present invention, embodiments of which are represented and described herein, may be useful for unit operations where there is only a single reaction. By way of example only, reactor microchannel 52 may serve as a vaporizer. Similarly, an MCT device may comprise a first combustor microchannel in thermal communication with a second combustor microchannel, the combustor microchannels supported by one or more oxidizer microchannels. And, as discussed herein above, oxidative combustion need not be one of the reactions involved. To further illustrate the flexibility of the present invention, FIG. 3b shows a modification of the MCT processing unit 50 of FIG. 3a. All descriptions in FIG. 3a are attributable to FIG. 3b but the flow is shown in a countercurrent pattern.

FIG. 4 shows another embodiment of the present invention. An MCT processing unit 80 has a total core volume V (not shown) and comprises a reactor microchannel 82, a combustor microchannel 92, and an oxidizer microchannel 102. The reactor microchannel 82 comprises a first reactor heat exchange microchannel 84, a reaction microchannel 86, and a second reactor heat exchange microchannel 88. Alternatively, only one reactor heat exchange microchannel may be present. Also, as will be understood by those skilled in the art, the precise point where the reactor microchannel 82 is functioning primarily as a reactor or not can be difficult to determine and can be somewhat arbitrary. For example, the reactor microchannel 82 may be in thermal communication with one or more other microchannels in the same device. The reaction microchannel 86 may further include a reaction catalyst 90. Alternatively, depending upon the desired reaction, the reaction microchannel 86 may include no reaction catalyst 90.

The combustor microchannel 92 comprises a first combustor heat exchange microchannel 94, a combustion microchannel 96, and a second combustor heat exchange microchannel 98. As with the reactor microchannel 82, alternatively, only one combustor heat exchange microchannel may be present. Also, as with the reactor microchannel 82, as will be understood by those skilled in the art, the precise point where the combustor microchannel 92 is no longer primarily exchanging heat and is functioning primarily as a combustor can be difficult to determine and somewhat arbitrary. For example, the combustor microchannel 92 may be in thermal communication with one or more other microchannels in the same device. The combustion microchannel 96 may also include a combustion catalyst 100. To provide further flexibility, the first combustor heat exchange microchannel 94 and the second heat exchange microchannel 98 may also include combustion catalyst 100. The combustion catalyst 100 may be [different types of catalysts and different methods of applying]. Alternatively, depending upon the desired combustion, the combustion microchannel 96, the first combustor heat exchange microchannel 94, and the second combustor heat exchange microchannel 98 may include no combustion catalyst 100.

The oxidizer microchannel 102 comprises one or more apertures 104 through which the oxidizer microchannel 102 is in fluid communication with the combustor microchannel 92.

Operation of the MCT processing unit 80, by way of example only, is analogous to that described herein above in reference to the MCT processing unit 50.

As will be appreciated by those skilled in the art, the apertures 74 (shown in FIGS. 3a and 3b) and the apertures 104 (shown in FIG. 4) add yet another dimension to the design flexibility of the present invention. By varying the placement, cross-section, shape, and size of a plurality of apertures 74 and of a plurality of apertures 104, significant flexibility can be achieved in combining two or more streams. Likewise, the thickness of the material through which the apertures 74 and the apertures 104 are created can add yet another dimension to the design flexibility. By changing these variables, the mixing or fluid communication between the two streams can be uniquely controlled. By way of example only, in a combustion application, the temperature profile and the heat transferred can be tailored to the particular application and reactor design. This is achieved because the oxidizer stream 78 acts as a limiting agent in a combustion reaction. Thus, the apertures 74 and apertures 104 function to introduce specific amounts of the oxidizer stream 78 to specific points so as to control the rate and extent of the combustion reaction along the entire length of the combustor microchannel 62 and combustor microchannel 92.

Figure 5:
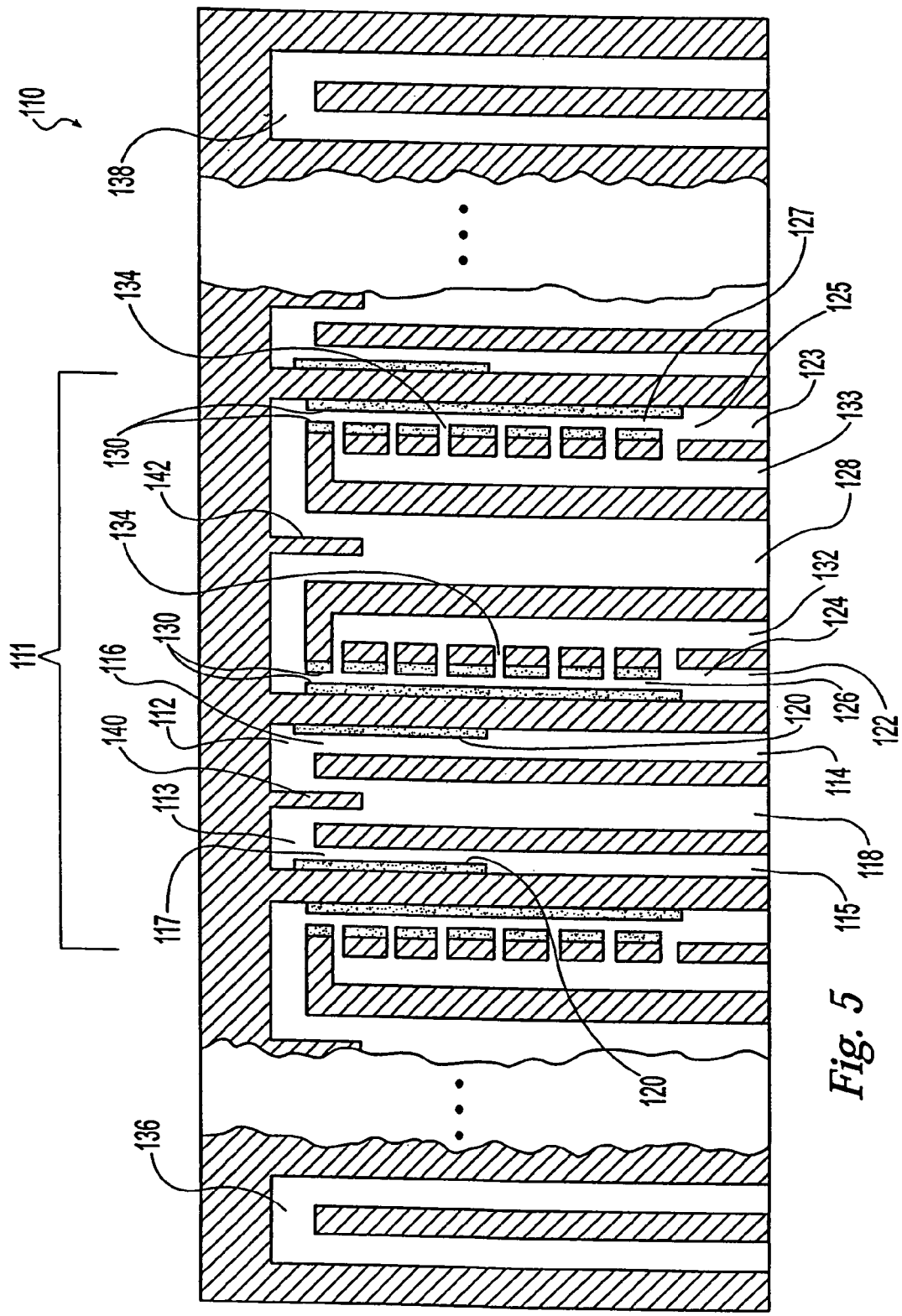
FIG. 5 is a cross-section view of an MCT processing system having a heat exchange portion and a reaction portion in combination according to the present invention.

Referring now to FIG. 5, an MCT processing system 110 has a total core volume V (not shown) and comprises a plurality of MCT processing units 111, a first termination microchannel 136, and a second termination microchannel 138. As will be understood by those skilled in the art, the choice of termination modes may be varied according to the design requirements of the MCT processing system 110. As discussed herein above, to realize the advantages of MCT, multiple MCT processing units 111 must be combined into an integrated system to approach the total throughput of a large-scale operation. The MCT processing system 110 helps accomplish that by integrating a plurality of MCT processing units 111, the basic technology of which has been introduced herein above.

Each MCT processing unit 111 comprises a first reactor microchannel 112, a second reactor microchannel 113, a first combustor microchannel 122, a second combustor microchannel 123, a first oxidizer microchannel 132, and a second oxidizer microchannel 133. The first reactor microchannel 112 comprises a first reactor heat exchange microchannel 114, a first reaction microchannel 116, and a third reactor heat exchange microchannel 118. The second reactor microchannel 113 comprises a second reactor heat exchange microchannel 15 and a second reaction microchannel 117 and is in fluid communication with the third reactor heat exchange microchannel 118. The first reaction microchannel 116 may also include a reaction catalyst 120. The second reaction microchannel 117 may also include a reaction catalyst 120. Preferably, as shown in FIG. 5, a reactor microchannel tongue 140 is also included.

The first combustor microchannel 122 comprises a first combustor heat exchange microchannel 124, a first combustion microchannel 126, and a third combustor heat exchange microchannel 128. The second combustor microchannel 123 comprises a second combustor heat exchange microchannel 125 and a second combustion microchannel 127 and is in fluid communication with the third combustor heat exchange microchannel 128. The first combustion microchannel 126 may also include a combustion catalyst 130. The second combustion microchannel 127 may also include a combustion catalyst 130. Preferably, as shown in FIG. 5, a combustor microchannel tongue 142 is also included. The reactor microchannel tongue 140 and the combustor microchannel tongue 142 provide flow stabilization and, if non-rigid, flow equalization to overcome minor variations in microchannel dimensions.

The first oxidizer microchannel 132 comprises at least one aperture 134 through which the first oxidizer microchannel 132 is in fluid communication with the first combustor microchannel 126. The second oxidizer microchannel 133 comprises at least one aperture 134 through which the second oxidizer microchannel 133 is in fluid communication with the second combustor microchannel 123.

Operation of each MCT processing unit 111, by way of example only, is analogous to that described herein above in reference to the MCT processing unit 50 and the MCT processing unit 80.

Figure 6A:
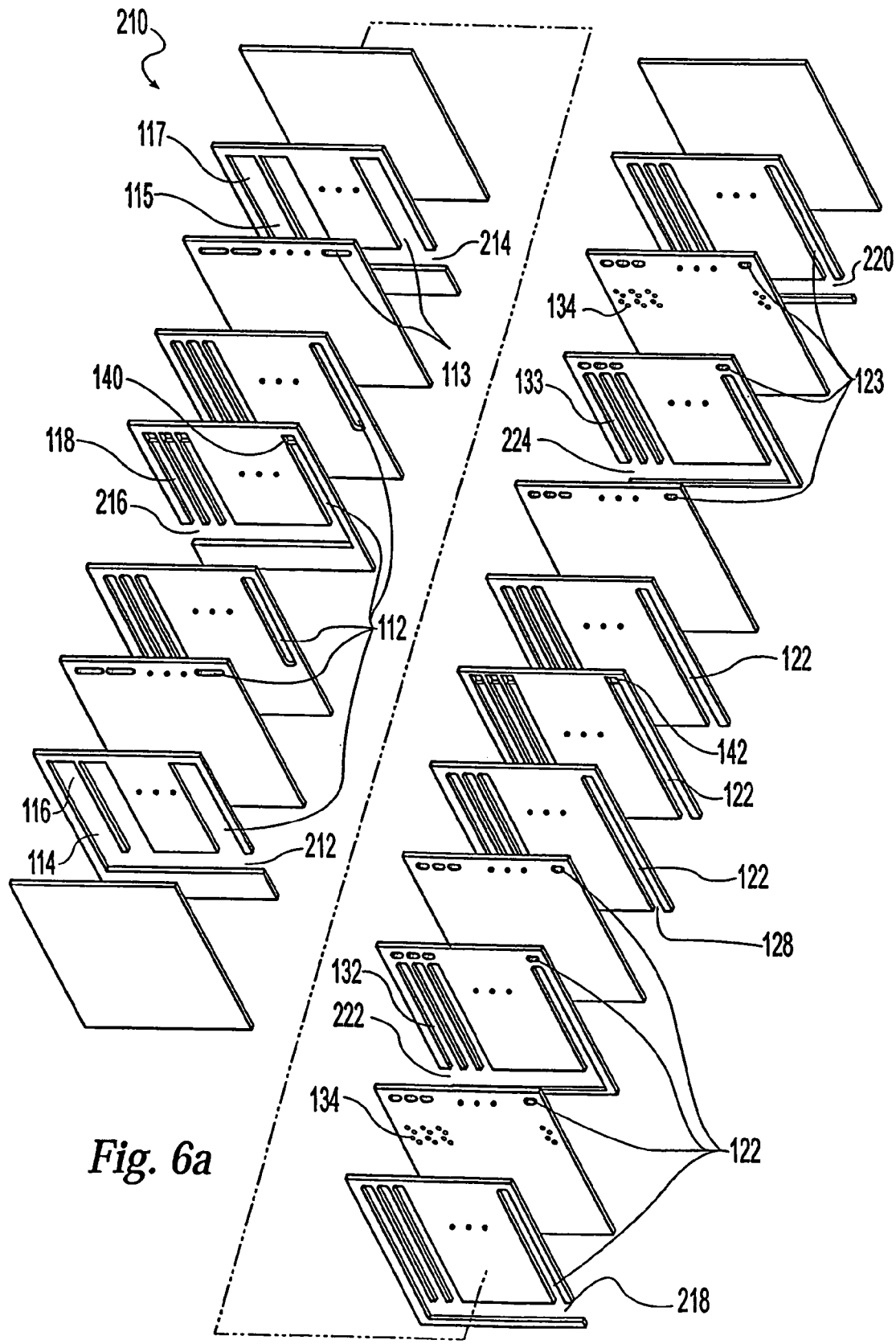
FIG. 6a is an exploded perspective view of an MCT processing complex according to the present invention.
Figure 7A:
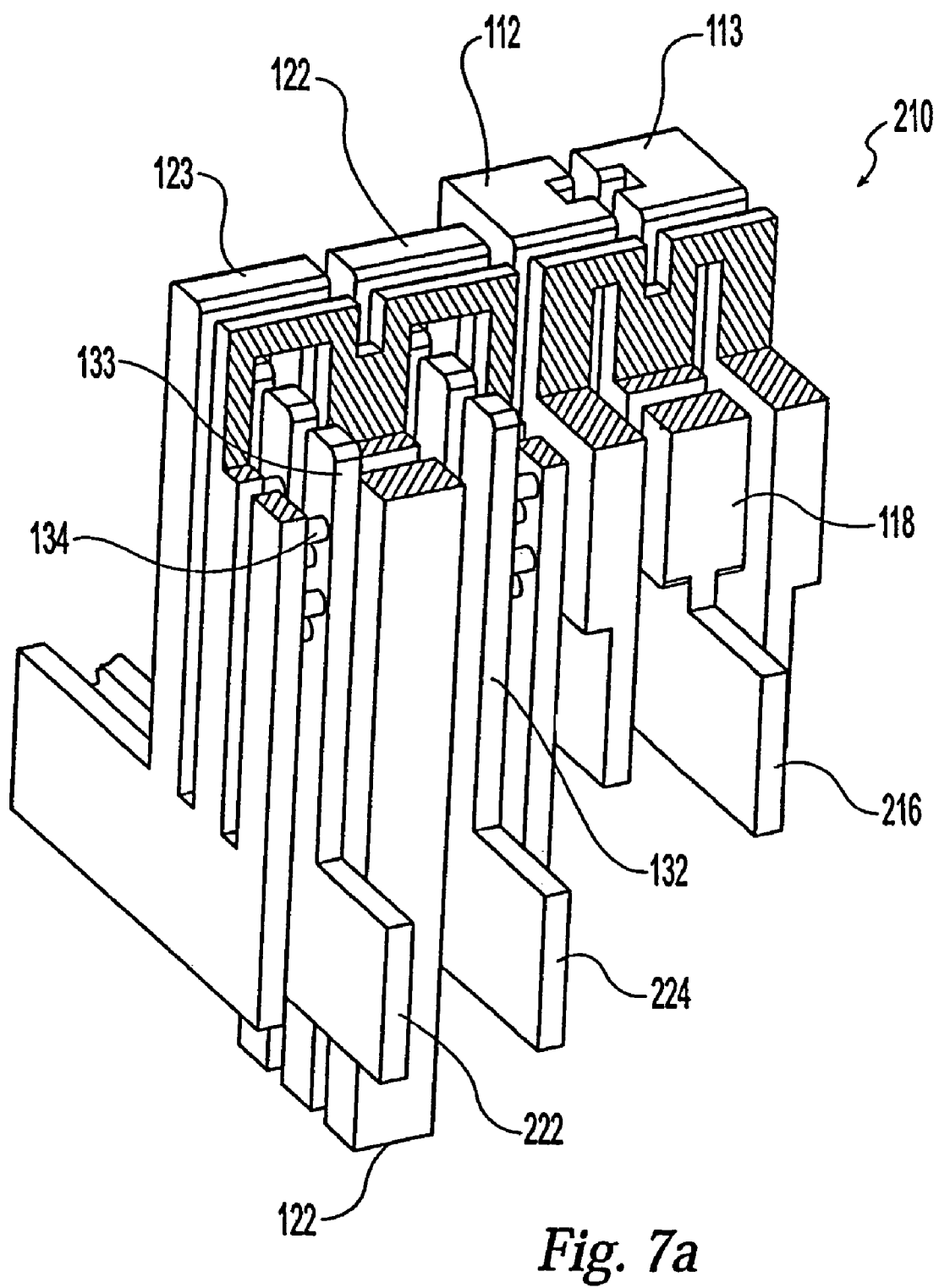
FIG. 7a is a modified negative cutaway perspective view of the MCT processing complex shown in FIG. 6a where channels are shown as solid regions.
Figure 7B:
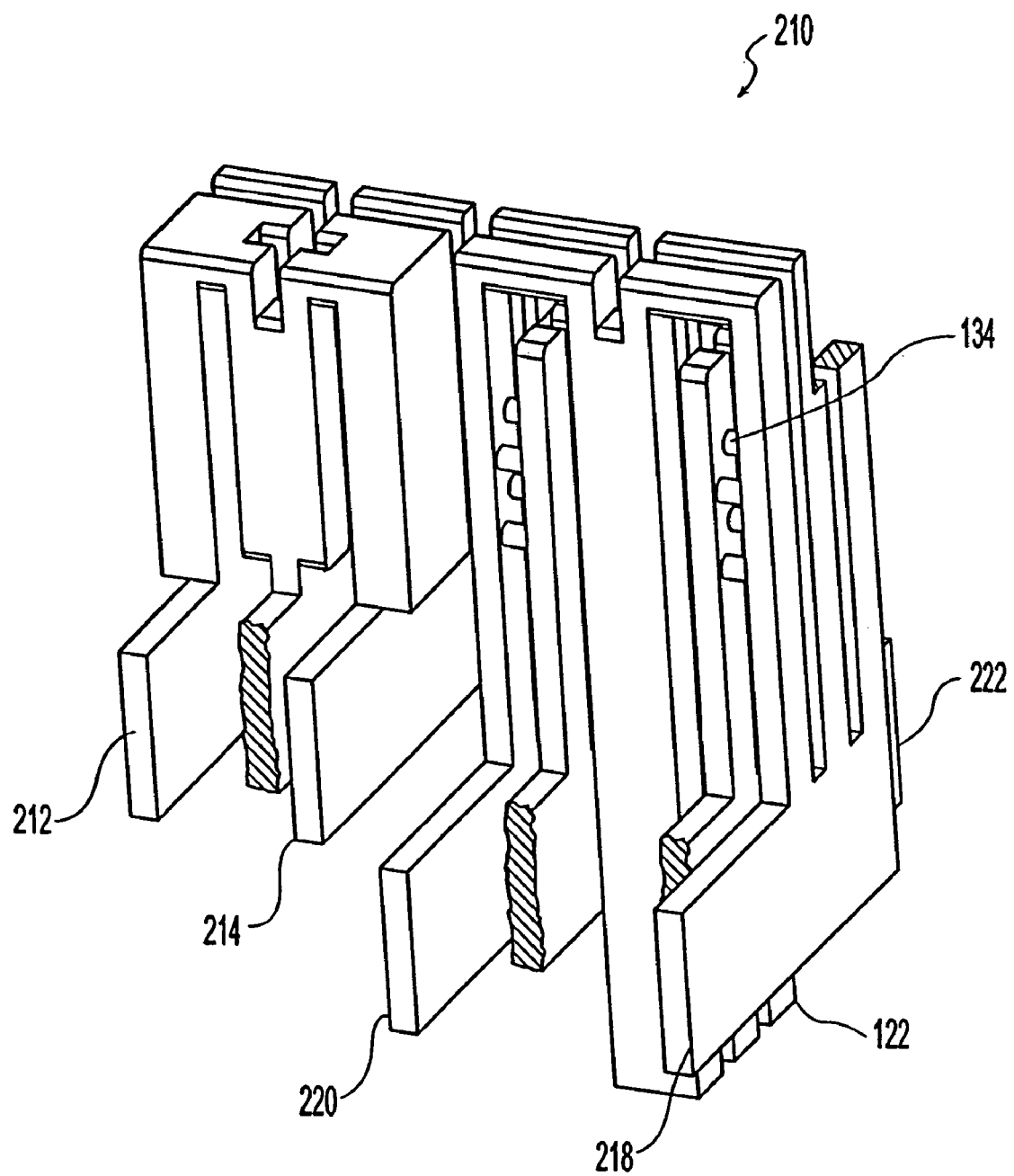

Referring now to FIG. 6a, an MCT processing complex 210 has a total core volume V (not shown) and comprises a plurality of MCT processing systems 110 (best illustrated in FIG. 5), a first reactants manifold 212, a second reactants manifold 214, a products manifold 216, a first fuel manifold 218, and a second fuel manifold 220. As will be appreciated by those skilled in the art, the precise arrangement of each manifold is subject to various design considerations and it is within the scope and intent of the present invention to include other such arrangements. By way of example only, the first fuel manifold 218, the second fuel manifold 220, the first reactants manifold 212, and the second reactants manifold 214 the first reactants manifold 212, and the second reactants manifold 214 all terminate on the same face of the MCT processing complex 210 but at different positions along an external face of the MCT processing complex 210. (Also seen in FIGS. 8a and 8b.) As will further be appreciated by those skilled in the art, an exhaust manifold (not shown) could also be included to collect fluids exiting the third combustor heat exchange microchannels 128. By way of further illustration, FIGS. 7a and 7b show a partial cutaway negative wireframe view of the microchannel arrangement shown in FIG. 6a. In addition to a plurality of MCT processing systems 110, it is preferable to repeat the MCT processing complex 210 to form an MCT processing stack 310 (illustrated in FIGS. 8 and 9) capable of high throughput.

Figure 6B:
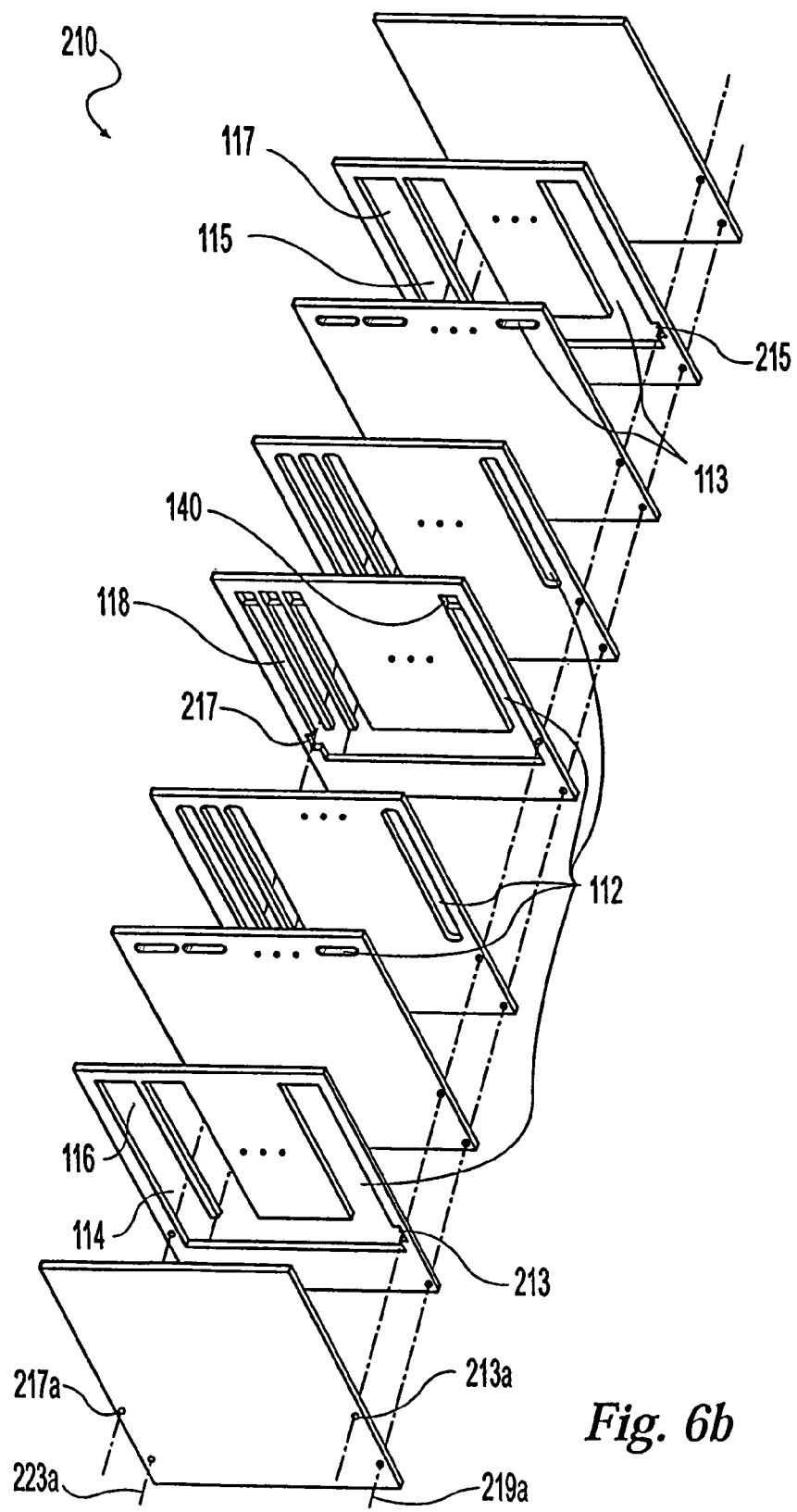
FIG. 6b is an exploded perspective view of an MCT processing complex reaction portion according to a further embodiment of the present invention.
Figure 6C:
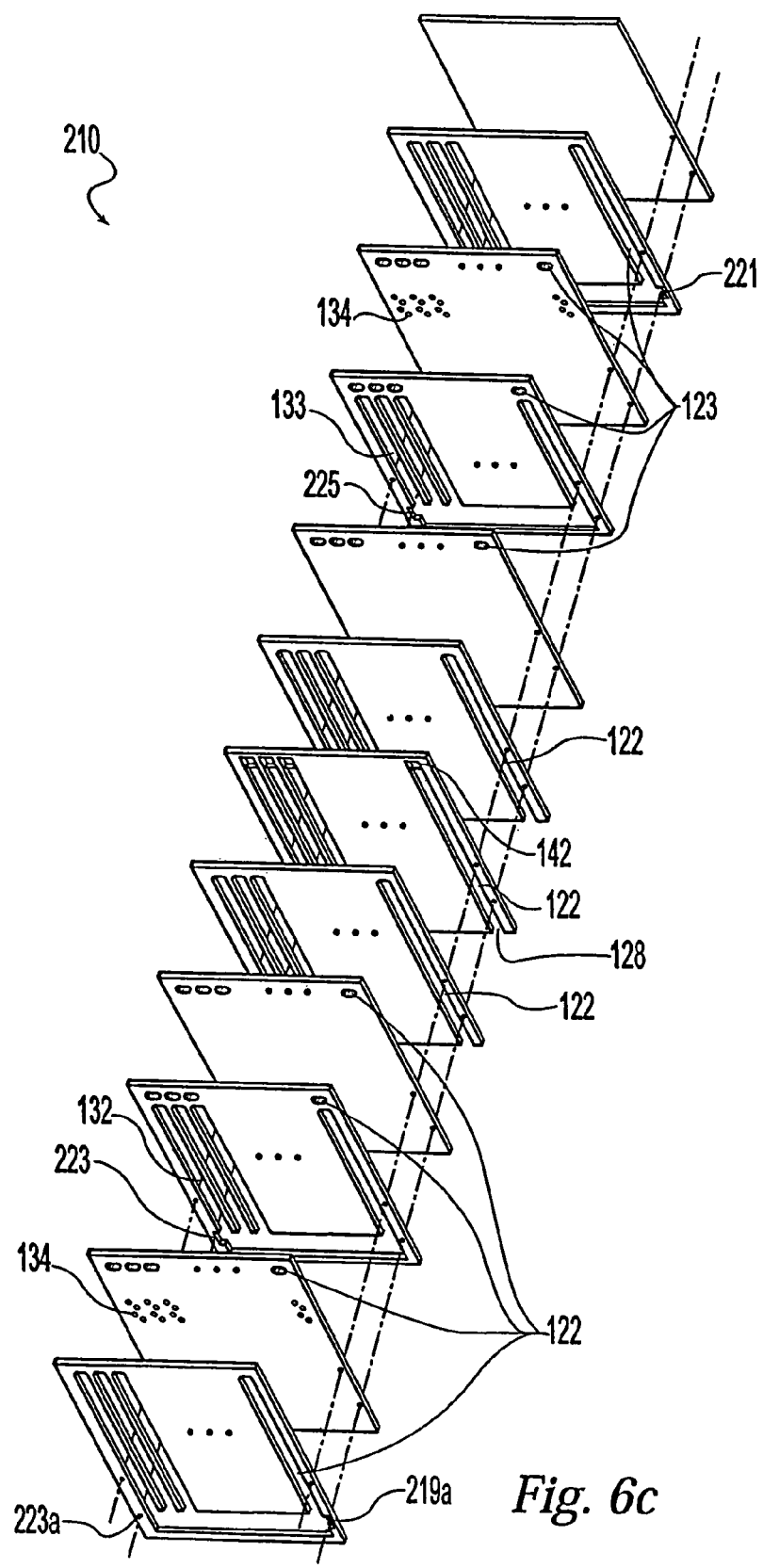
FIG. 6c is an exploded perspective view of an MCT processing complex combustion portion according to a further embodiment of the present invention.

FIGS. 6b and 6c illustrate a further embodiment of the present invention for manifolding the various microchannels. For example, a reactants flue 213a provides fluid communication between a plurality of first reactor microchannels 116 and an outside surface of the MCT processing complex 210 via the first reactants manifold 212 and a first reactants manifold stub 213 and between a plurality of second reactants microchannels 117 and an outside surface of the MCT processing complex 210 via the second reactants manifold 214 and a second reactants manifold stub 215. Likewise, a products flue 217a provides analogous fluid communication for a plurality of third reactor heat exchange microchannels 118, a fuel flue 219a provides analogous fluid communication for a plurality of first combustor microchannels 122 and a plurality of second combustor microchannels 123, and the oxidizer flue 223a provides analogous fluid communication for a plurality of first oxidizer microchannels 132 and a plurality of second oxidizer microchannels 133. As will be appreciated by those skilled in the art, an exhaust flue may provide fluid communication between a plurality of third combustor heat exchange microchannels 128, thus further illustrating the design flexibility of the present invention. In addition, by way of example only, the orientations of the first reactants manifold stub 213, the first reactants manifold 212, and the plurality of first reactor microchannels 116 relative to one another is virtually infinitely flexible. Thus, allowing even further design flexibility depending upon the specific application.

Figure 8B:
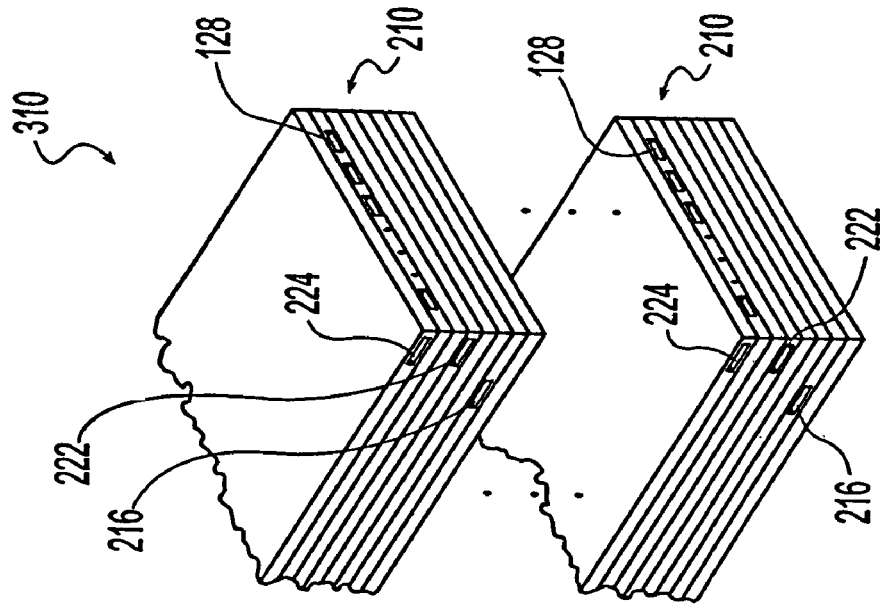
Figure 8A:
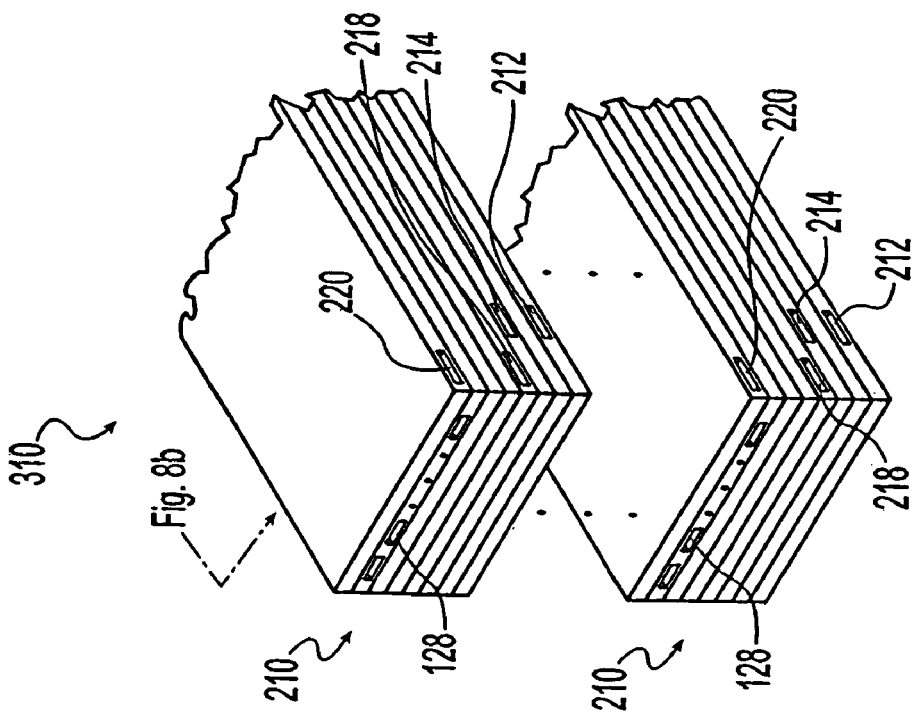
FIG. 8a is a perspective view an MCT processing stack according to a further embodiment of the present invention.

Referring now to FIGS. 8a and 8b, an MCT processing stack 310 has a total core volume V (not shown) and comprises a plurality of MCT processing complexes 210. Shown in FIG. 8a are a plurality of first fuel manifolds 218 and second fuel manifolds 220 in substantial linear alignment, a plurality of first reactants manifolds 212 and second reactants manifolds 214 in substantial linear alignment, and a plurality of third combustion heat exchanger microchannels 128 in substantial linear alignment. Shown in FIG. 8b are a plurality of first oxidizer manifolds 222 and second oxidizer manifolds 224 in substantial linear alignment, and a plurality of products manifolds 216 in substantial linear alignment. While FIGS. 8a and 8b illustrate a specific relational arrangement of manifolds and the plurality of third combustor heat exchange microchannels 128, it will be understood by one skilled in the art that other arrangements are possible.

Figure 9:
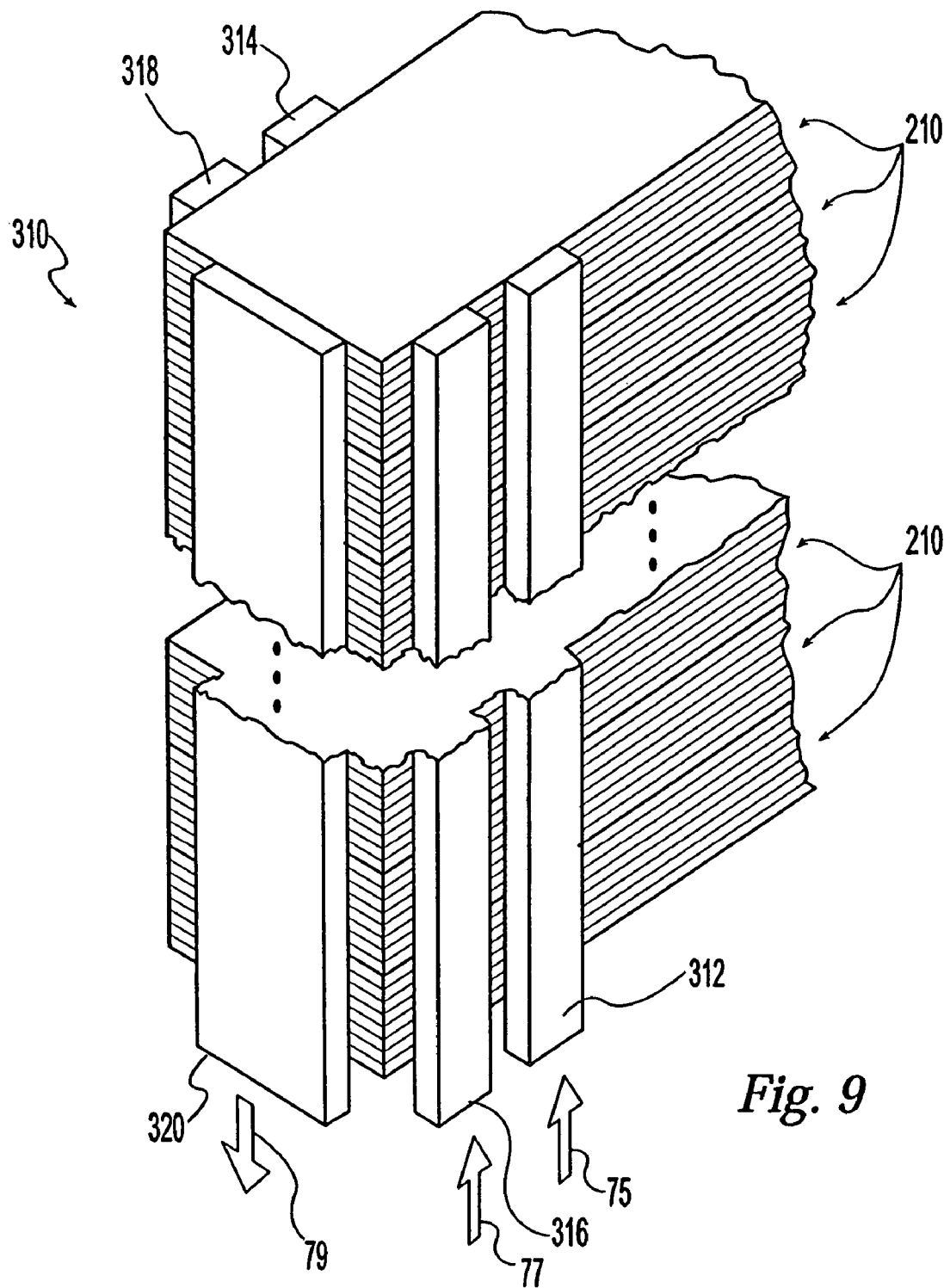
FIG. 9 is a perspective view of the MCT processing stack shown in FIG. 8a illustrating stream headers and stream flows.

Referring now to FIG. 9, an MCT processing stack 310 comprises a plurality of MCT processing complexes 210, a reactants header 312, a products header 314, a fuel header 316, an oxidizer header 318, and an exhaust header 320. As will be appreciated by those skilled in the art, the precise arrangement of each manifold is subject to various design considerations and it is within the scope and intent of the present invention to include other such arrangements.

Fabrication of the MCT processing stack 310 is by know techniques. The MCT processing complexes 210 are made as first subassemblies. The headers 312, 314, 316, 318 are then conventionally welded onto the exterior of the subassemblies. The heating rate during welding must be closely monitored to ensure a high level of quality; hot spots may damage the subassemblies, including delamination. In addition to welding on the headers 312, 314, 316, 318, the subassemblies themselves may be welded into place on any form of infrastructure. This infrastructure, by way of example only, may serve as outer protection, fixing the device in space, safety containment, insulation, cooling jacket, and lifting points.

In operation, by way of example only, a reactants stream 75 is introduced into the reactants header 312, a products stream 76 is discharged from the products header 314, a fuel stream 77 is introduced into the fuel header 316, an oxidizer stream 78 is introduced into the oxidizer header 318, and the exhaust stream 79 is discharged form the exhaust header 320. The embodiment shown in FIGS. 8a-9 shows a plurality of integral heat exchanger and reactor combinations. There are five distinct fluid streams: The reactants stream 75, the products stream 76, the oxidizer stream 78, the fuel stream 77, and the exhaust stream 79. As shown in the accompanying figures, the exhaust stream 79 exits straight out of each MCT processing complex 210 via each third combustor heat exchange microchannel 128. Alternatively, any of the other streams could be headered straight off each MCT processing complex 210. The exhaust stream 79 was selected to minimize the overall pressure drop of the oxidizer stream 78-fuel stream 77-exhaust stream 79 system. The four remaining streams are headered on the sides of each MCT processing complex 210 and, thus, on the sides of the MCT processing stack 310. Each fluid stream enters or exits at different points along the length of each MCT processing complex 210. For multi-stream devices, therefore, fluids may enter or exit at different points of the MCT processing complex 210, thus allowing much design flexibility in the thermal profile. For example, streams that enter much warmer than other streams may be selected to be headered further down the length, or toward warmer sections of the device. Thus, advantage is taken of the monotonically increasing temperature profile feature of the device. The heights of the manifolds is selected to generally minimize overall pressure drop while still allowing for good flow distribution among the internal array of microchannels. Smaller heights may be utilized where higher pressure drops can be tolerated.

CLOSURE

While the invention has been explained in relation to various detailed embodiments, it is to be understood that various modifications thereof will become apparent to those skilled in the art upon reading the Specification. Therefore, it is to be understood that the invention disclosed herein is intended to cover such modifications as fall within the scope of the appended claims.

We claim:

1. A process, comprising:
   (a) distributing a first inlet stream into a plurality of first microchannels, thereby forming a plurality of first inlet streams;
   (b) distributing a second inlet stream into a plurality of second microchannels, thereby forming a plurality of second inlet streams;
   (c) distributing a third inlet stream into a plurality of third microchannels, thereby forming a plurality of third inlet streams;
   (d) contacting the plurality of second inlet streams and the plurality of third inlet streams, wherein at least one chemical reaction is effected, thereby forming a plurality of second outlet streams;
   (e) transferring heat between the plurality of first inlet streams and the at least one chemical reaction, thereby forming a plurality of first outlet streams; and
   (f) transferring heat between the plurality of first inlet streams and the plurality of first outlet streams.

2. The process of claim 1, wherein the step of contacting the plurality of second inlet streams and the plurality of third inlet streams comprises:
   (a) distributing at least one of the plurality of third inlet streams into a plurality of apertures.

3. The process of claim 1, further comprising steps chosen from the group consisting of:
   (a) introducing the first inlet stream into a first manifold;
   (b) introducing the second inlet stream into a second manifold;
   (c) introducing the third inlet stream into a third manifold; and
   (d) combinations thereof.

4. The process of claim 1, wherein the first stream comprises at least one hydrocarbon.

5. The process of claim 1, wherein the second stream comprises at least one combustible compound.

6. The process of claim 1, wherein the third stream comprises at least one oxidizing compound.

7. The process of claim 1, further comprising the step of:
   (a) transferring heat between the plurality of second outlet streams and the plurality of third inlet streams.

8. The process of claim 1, further comprising the step of:
   (a) transferring heat between the plurality of second outlet streams and the plurality of second inlet streams.

9. The process of claim 1, further comprising the step of:
   (a) transferring heat between the plurality of second inlet streams and the plurality of third inlet streams.

10. The process of claim 1, further comprising the step of:
    (a) transferring heat between the plurality of second outlet streams and the plurality of first inlet streams.

11. A process, comprising:
    (a) distributing a first inlet stream into a plurality of first microchannels, thereby forming a plurality of first inlet streams;
    (b) distributing a second inlet stream into a plurality of second microchannels, thereby forming a plurality of second inlet streams;
    (c) distributing a third inlet stream into a plurality of third microchannels, thereby forming a plurality of third inlet streams;
    (d) contacting the plurality of second inlet streams and the plurality of third inlet streams, wherein at least one chemical reaction is effected, thereby forming a plurality of second outlet streams; and
    (e) transferring heat between the plurality of second outlet streams and the plurality of third inlet streams.

12. The process of claim 11, further comprising the step of:
    (a) transferring heat between the plurality of second outlet streams and the plurality of second inlet streams.

13. The process of claim 11, further comprising the step of:
    (a) transferring heat between the plurality of second inlet streams and the plurality of third inlet streams.

14. The process of claim 11, further comprising the step of:
    (a) transferring heat between the plurality of second outlet streams and the plurality of first inlet streams.

15. A process, comprising:
    (a) distributing a first inlet stream into a plurality of first microchannels, thereby forming a plurality of first inlet streams;
    (b) distributing a second inlet stream into a plurality of second microchannels, thereby forming a plurality of second inlet streams;
    (c) distributing a third inlet stream into a plurality of third microchannels, thereby forming a plurality of third inlet streams;
    (d) contacting the plurality of second inlet streams and the plurality of third inlet streams, wherein at least one chemical reaction is effected, thereby forming a plurality of second outlet streams; and
    (e) transferring heat between the plurality of second outlet streams and the plurality of second inlet streams.

16. The process of claim 15, further comprising the step of:
    (a) transferring heat between the plurality of second inlet streams and the plurality of third inlet streams.

17. The process of claim 15, further comprising the step of:
    (a) transferring heat between the plurality of second outlet streams and the plurality of first inlet streams.

18. A process, comprising:
    (a) distributing a first inlet stream into a plurality of first microchannels, thereby forming a plurality of first inlet streams;
    (b) distributing a second inlet stream into a plurality of second microchannels, thereby forming a plurality of second inlet streams;
    (c) distributing a third inlet stream into a plurality of third microchannels, thereby forming a plurality of third inlet streams;

(d) contacting the plurality of second inlet streams and the plurality of third inlet streams, wherein at least one chemical reaction is effected, thereby forming a plurality of second outlet streams; and
(e) transferring heat between the plurality of second inlet streams and the plurality of third inlet streams.

19. The process of claim 18, further comprising the step of:
(a) transferring heat between the plurality of second outlet streams and the plurality of first inlet streams.

* * * * *

UNITED STATES PATENT AND TRADEMARK OFFICE
CERTIFICATE OF CORRECTION

| | | |
|---|---|---|
| PATENT NO. | : 7,780,944 B2 | Page 1 of 1 |
| APPLICATION NO. | : 11/300914 | |
| DATED | : August 24, 2010 | |
| INVENTOR(S) | : Mathias et al. | |

It is certified that error appears in the above-identified patent and that said Letters Patent is hereby corrected as shown below:

Column 19, line 59, "first stream" should be changed to --first inlet stream-- and the claim read as follows:

4. The process of claim 1, wherein the first inlet stream comprises at least one hydrocarbon.

Column 19, line 61, "second stream" should be changed to --second inlet stream-- and the claim read as follows:

5. The process of claim 1, wherein the second inlet stream comprises at least one hydrocarbon.

Column 19, line 63, "third stream" should be changed to --third inlet stream-- and the claim read as follows:

6. The process of claim 1, wherein the third inlet stream comprises at least one oxidizing compound.

Signed and Sealed this
Eighth Day of March, 2011

David J. Kappos
*Director of the United States Patent and Trademark Office*